Sept. 19, 1961    L. L. BEWLEY ET AL    3,000,556

DATA CONVERSION SYSTEM

Filed June 26, 1957    9 Sheets-Sheet 1

INVENTORS.
LAWRENCE L. BEWLEY
JERRY F. FOSTER
BY
Christie, Parker & Hale
ATTORNEYS Sept. 19, 1961 L. L. BEWLEY ET AL 3,000,556

DATA CONVERSION SYSTEM

Filed June 26, 1957 9 Sheets-Sheet 2

CODE WITH TRANSFER ALPHA FORMAT

| CODE MEANING | | IBM CARD CODE | | BUFFER CODE | | COMPUTER CODE | | |
|---|---|---|---|---|---|---|---|---|
| | | ZONE | DIGIT | ZONE | DIGIT | ZONE | DIGIT | |
| BLANK | | – | – | 0 | 0 | 0 | 0 | |
| DECIMAL POINT | . | 12 | 8 3 | 1 | 11 | 0 | 3 | |
| | ¤ | 12 | 8 4 | 1 | 12 | 0 | 4 | |
| | & | 12 | | 1 | 0 | 1 | 0 | |
| | $ | 11 | 8 3 | 2 | 11 | 1 | 3 | |
| | * | 11 | 8 4 | 2 | 12 | 1 | 4 | |
| | – | 11 | – | 2 | 0 | 2 | 0 | |
| | / | 0 | 1 | 4 | 1 | 2 | 1 | |
| COMMA | , | 0 | 8-3 | 4 | 11 | 2 | 3 | |
| | % | 0 | 8-4 | 4 | 12 | 2 | 4 | |
| | # | – | 8-3 | 0 | 11 | 3 | 3 | |
| | @ | – | 8-4 | 0 | 12 | 3 | 4 | |
| | +0 | 12 | 0 | 5 | 0 | 4 | 0 | |
| | A | 12 | 1 | 1 | 1 | 4 | 1 | |
| | B | 12 | 2 | 1 | 2 | 4 | 2 | |
| | C | 12 | 3 | 1 | 3 | 4 | 3 | |
| | D | 12 | 4 | 1 | 4 | 4 | 4 | |
| | E | 12 | 5 | 1 | 5 | 4 | 5 | |
| | F | 12 | 6 | 1 | 6 | 4 | 6 | |
| | G | 12 | 7 | 1 | 7 | 4 | 7 | |
| | H | 12 | 8 | 1 | 8 | 4 | 8 | |
| | I | 12 | 9 | 1 | 9 | 4 | 9 | |
| | -0 | 11 | 0 | 6 | 0 | 5 | 0 | |
| | J | 11 | 1 | 2 | 1 | 5 | 1 | |
| | K | 11 | 2 | 2 | 2 | 5 | 2 | |
| | L | 11 | 3 | 2 | 3 | 5 | 3 | |
| | M | 11 | 4 | 2 | 4 | 5 | 4 | |
| | N | 11 | 5 | 2 | 5 | 5 | 5 | |
| | O | 11 | 6 | 2 | 6 | 5 | 6 | |
| | P | 11 | 7 | 2 | 7 | 5 | 7 | |
| | Q | 11 | 8 | 2 | 8 | 5 | 8 | |
| | R | 11 | 9 | 2 | 9 | 5 | 9 | |
| | S | 0 | 2 | 4 | 2 | 6 | 2 | |
| | T | 0 | 3 | 4 | 3 | 6 | 3 | |
| | U | 0 | 4 | 4 | 4 | 6 | 4 | |
| | V | 0 | 5 | 4 | 5 | 6 | 5 | |
| | W | 0 | 6 | 4 | 6 | 6 | 6 | |
| | X | 0 | 7 | 4 | 7 | 6 | 7 | |
| | Y | 0 | 8 | 4 | 8 | 6 | 8 | |
| | Z | 0 | 9 | 4 | 9 | 6 | 9 | |
| ZERO | 0 | 0 | – | 4 | 0 | 8 | 0 | |
| | 1 | — | 1 | 0 | 1 | 8 | 1 | |
| | 2 | — | 2 | 0 | 2 | 8 | 2 | |
| | 3 | — | 3 | 0 | 3 | 8 | 3 | |
| | 4 | — | 4 | 0 | 4 | 8 | 4 | |
| | 5 | — | 5 | 0 | 5 | 8 | 5 | |
| | 6 | — | 6 | 0 | 6 | 8 | 6 | |
| | 7 | — | 7 | 0 | 7 | 8 | 7 | |
| | 8 | — | 8 | 0 | 8 | 8 | 8 | |
| | 9 | — | 9 | 0 | 9 | 8 | 9 | |
| | | 12 | — | | | 0 | | SIGN TIME ONLY |
| | | 11 | — | | | 1 | | |

FIG. 2.

INVENTORS.
LAWRENCE L. BEWLEY
JERRY F. FOSTER

BY Christie, Parker & Hale

ATTORNEYS

DATA CONVERSION SYSTEM

Filed June 26, 1957 9 Sheets-Sheet 3

INVENTORS.
LAWRENCE L. BEWLEY
JERRY F. FOSTER
BY
Christie, Parker & Hale
ATTORNEYS

DATA CONVERSION SYSTEM

Filed June 26, 1957 9 Sheets-Sheet 4

INVENTORS
LAWRENCE L. BEWLEY
JERRY F. FOSTER
BY
Christie, Parker & Hale
ATTORNEYS INVENTORS.
LAWRENCE L. BEWLEY
JERRY F. FOSTER
BY
Christie, Parker & Hale
ATTORNEYS INVENTORS.
LAWRENCE L. BEWLEY
JERRY FOSTER
BY
Christie, Parker & Hale
ATTORNEYS

| ZONE DIGIT | PREVIOUS NUMERIC DIGIT | ZONE DECADE |
|---|---|---|
| 0 | 0 | 0 |
| 0 | 1 → 9 | 8 |
| 0 | 11 OR 12 | 3 |
| 1 | 0 | 1 |
| 1 | 1 → 9 | 4 |
| 1 | 11 OR 12 | 0 |
| 2 | 0 | 2 |
| 2 | 1 → 9 | 5 |
| 2 | 11 OR 12 | 1 |
| 4 | 0 | 8 |
| 4 | 1 | 2 |
| 4 | 2 → 9 | 6 |
| 4 | 11 OR 12 | 2 |
| 5 | 0 | 4 |
| 6 | 0 | 5 |

INVENTORS.
LAWRENCE L. BEWLEY
JERRY F. FOSTER
BY
Christie, Parker & Hale
ATTORNEYS

DATA CONVERSION SYSTEM

INVENTORS.
LAWRENCE L. BEWLEY
JERRY F. FOSTER
BY
Christie, Parker & Hale
ATTORNEYS.

Sept. 19, 1961 L. L. BEWLEY ET AL 3,000,556

DATA CONVERSION SYSTEM

Filed June 26, 1957 9 Sheets-Sheet 9

INVENTORS.
LAWRENCE L. BEWLEY
JERRY F. FOSTER
BY
Christie, Parker & Hale
ATTORNEYS

3,000,556
DATA CONVERSION SYSTEM

Lawrence L. Bewley, Covina, and Jerry F. Foster, Arcadia, Calif., assignors to Burroughs Corporation, Detroit, Mich., a corporation of Michigan Filed June 26, 1957, Ser. No. 668,179
15 Claims. (Cl. 235—61.6)

This invention relates to data conversion apparatus and, more particularly, is concerned with converting data from standard punched card form to binary coded digital pulse form or other similar digital pulse form for direct use in an electronic digital computer.

The use of punched cards for storing information to be used in commercial business and accounting machines is well known. Because punched cards are in such general use today, it is desirable that punched card information be made directly usable in electronic digital computers. Commercial machines using punched cards generally require information to be stored in alphanumeric form, i.e., the information stored on the card must be alphabetic as well as numeric in character. Since the computer itself is basically a pure numeric machine, the alphanumeric information stored on the card must be converted by a conversion system to a digital code form which can be readily programmed in the computer.

Moreover, in any computer system involving a machine whose internal logic is organized into words of fixed length, it is necessary that any data conversion system take the information from the punched card and group it into words of the required number of digits for use in the computer.

By the present invention, such a data conversion system is provided which is capable of utilizing the full speed and capacity of the computing machine. In addition, the data conversion system of the present invention is capable of compressing the punch card information into the minimum number of digits required to carry such information in the computer. Thus, no information, time, or space within the computer is wasted.

In brief, the invention contemplates storage on an intermediate or buffer drum between the card reader or card punch machine and the computer. Format control bands on the buffer drum are used to program the transfer of information bits onto or off the buffer drum. Format can modify the information as it is transferred from card to computer in at least four ways. On input to the computer a format control can provide straight transfer or can delete a digit, insert a zero, or replace a digit by a zero. On input, the sign information can be placed at the proper end of the computer words by format control, or the digits can be compressed or spread out by deleting or adding zeros.

The buffer drum further provides a means of changing the standard IBM code, used in many punch card systems, from alphanumeric information on the punch cards to binary coded digit form having a collating sequence for use in the computer.

For a better understanding of the invention, reference should be had to the accompanying drawings, wherein:

FIG. 2 is a table showing the correlation between the standard IBM card, the buffer drum code, and the computer code used for translating the standard alphanumeric characters;

Figure 1:
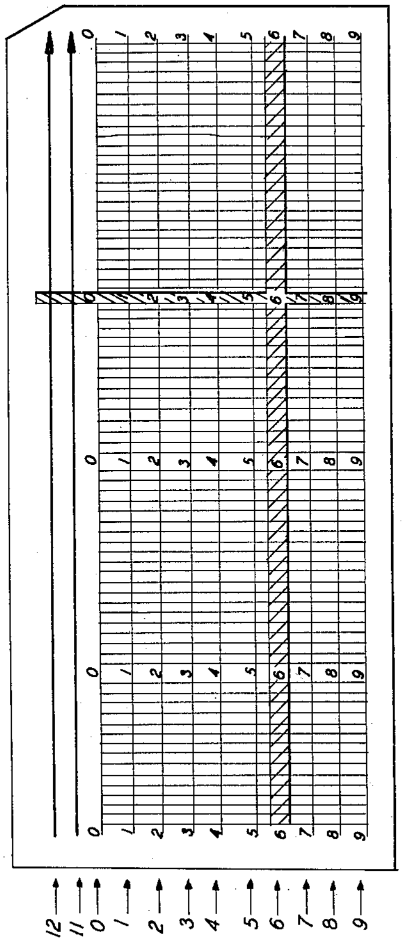
FIG. 1 is a replica of a standard IBM punch card.

Referring to FIG. 1, there is shown a standard IBM punch card. The punch positions on the card are defined by twelve horizontal rows designated from the top down as the 12 row, 11 row, and 0 through 9 rows. The card is also divided into eighty vertical columns. Numbers are stored on the punch card by punching each digit of the number in the corresponding row of the card. Generally certain columns are set aside for numbers representing one type of information, i.e., numbers representing an account number, or a dollar balance etc. These specific columns on the punch card are referred to as information fields. Letters and other symbols are represented by two or more punches in each column. Thus, the twenty-six letters of the alphabet involve one punch in the 12, 11 or 0 rows and a second punch in the 1 through 9 rows, according to the standard IBM card code. The punches in the 12, 11 and 0 rows are referred to as over-punches, the 12, 11 and 0 rows being referred to as zone rows in contrast to the remaining digit rows referred to as numeric rows. FIG. 2, in the next to the left-hand column, shows the rows by number which are punched to represent a given number, letter or standard symbol as set forth in the left-hand column, according to the standard IBM code.

Figure 3:
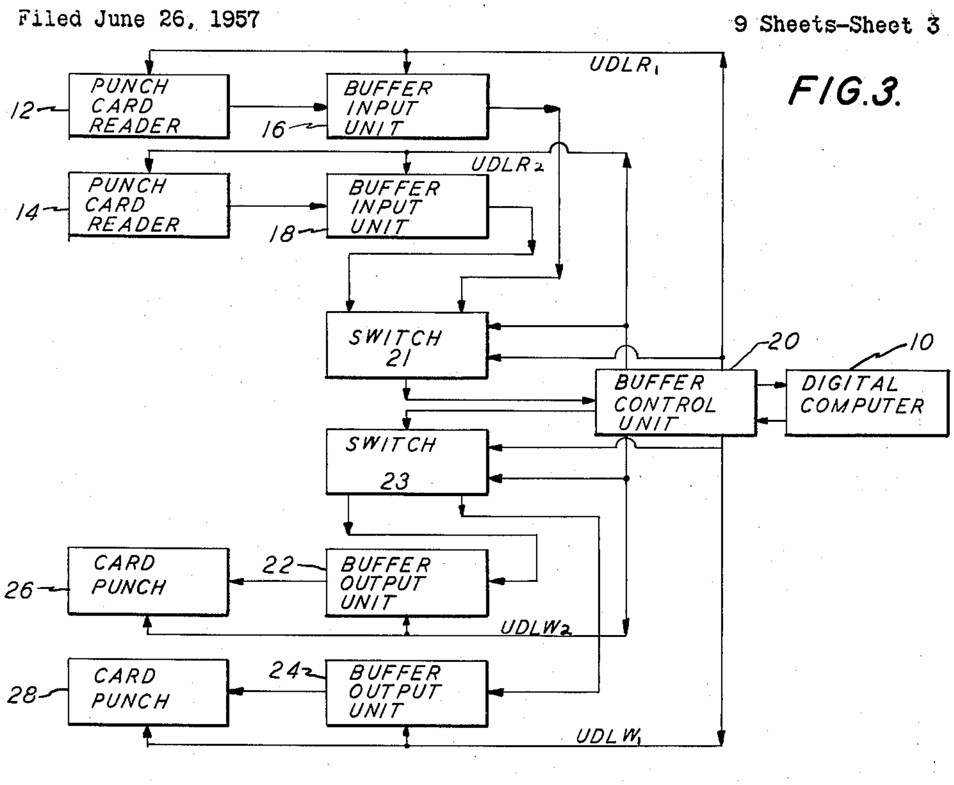
FIG. 3 is a block diagram of the complete converter.

Referring to FIG. 3, there is shown a block diagram of the main components of the data conversion system. The numeral 10 indicates generally a digital computer, which is preferably of a binary-coded decimal type, such as particularly described in an article entitled "Engineering Description of the Electrodata Digital Computer" by John C. Aldrich, appearing in the Transactions of the IRE, Professional Group on Electronic Computers, vol. EC–4, No. 1, March 1955. Information is fed into the digital computer from selected ones of a plurality of punch card reader units, such as indicated at 12 and 14. The punch card reader units are standard machines available on the market for reading punch cards, the reader units required for the present invention preferably being of a type having at least two reading positions or stations, i.e., two positions in which the punched information on the cards can be read out electrically. See Patent No. 2,275,396.

The information read out of each punch card reader for each card fed through the reader is stored temporarily in a buffer input unit, such as indicated at 16 and 18. The buffer input units include a format control by which the form of the information appearing on the punch cards may be rearranged in a selected manner as required for proper operation of the digital computer 10. The buffer input units store the information in modified form, referred to as the buffer code, for the purpose and in the manner which will hereinafter be more fully explained.

Information stored in the buffer input units is fed into the digital computer 10 through a buffer control unit 20. The buffer control unit 20 selects one of the buffer input units by means of a selector switch 21, and controls the transfer of information to the computer, dividing the information received from the selected buffer input unit into standard word lengths for feeding into the registers of the digital computer 10. At the same time the buffer control unit 20 compresses or modifies the information transferred, as required by the format control in the buffer input unit. The buffer control unit 20 receives commands from the digital computer 10 by which it selects one of several punch card reader units and also by which it controls the transfer of information from the card readers to the buffer input units, and from the buffer input units to the digital computer.

The buffer control unit 20 also receives output information from the digital computer 10. It transfers, by means of a switching circuit 23, output information to any one of a number of buffer output units, as indicated at 22 and 24, by means of which a plurality of card punch units, such as indicated at 26 and 28, may be controlled to record information from the computer 10 in punched-card form. Instead of a punch card machine on output, a standard printing or tabulating machine may be used. The buffer control unit 20, in conjunction with the buffer output units 22 and 24, modifies and rearranges the information received from the computer according to format control information stored in the selected buffer output unit to spread out the information in the desired fields on the punch card in any selected manner. The manner and means for converting information from the computer to card punch or tabulator is described in detail in copending application Serial No. 668,214 filed June 26, 1957, now Patent No. 2,944,733.

Figure 4:
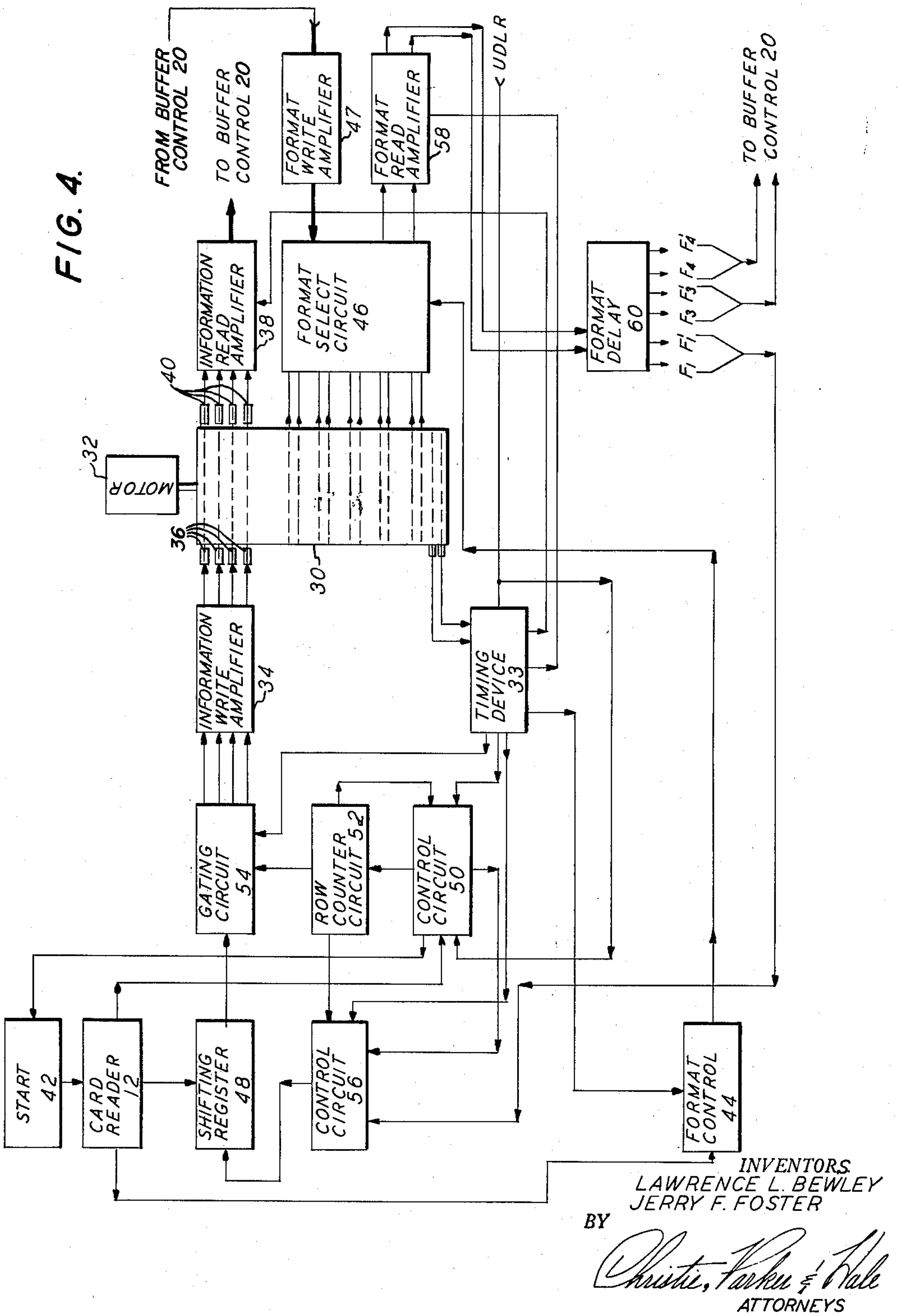
FIG. 4 is a block diagram of a buffer input unit.

Referring to FIG. 4, a buffer input unit is shown in functional block diagram form. The buffer input unit includes a magnetic storage drum 30. The storage drum is rotated by a motor 32 and is arranged to have an information band comprising four storage tracks, five format bands, each comprising two tracks, and a timing-pulse band including two tracks. By means of the four information tracks in the information band, binary information bits may be simultaneously recorded representative of any one of the sixteen decimal numbers 0 through 15. The binary-coded decimal digits are recorded magnetically in conventional manner in the form of pulses or no-pulses in their respective tracks, corresponding to the binary digits 1 to 0 respectively.

One timing track generates a single output pulse per revolution of the drum, called the zero pulse and indicated on the drawings, where applied to a circuit, as ZP. The other timing track generates 319 output pulses per revolution, referred to as buffer pulses and indicated on the drawings, where applied to a circuit, as BP. The zero pulse and buffer pulses together in effect divide the circumference of the drum into 320 divisions, called information positions.

The pulses are fed from the drum to a timing generator 33 which regenerates and sharpens the pulses and delays the buffer pulses by different selected amounts as required for proper timing sequence of the various circuits in the buffer input unit. On the drawings, buffer pulses from a selected buffer input or output unit are designated with a subscript *s*. Buffer pulses which are delayed are indicated in the drawings by a number after the BP, the number indicating the relative amount of delay. Thus, a BP–5 pulse is delayed longer than a BP–2 pulse, as generated by the generator 33.

The binary pulses are recorded on the drum 30 by means of an information write amplifier 34 including four channels of amplification coupled respectively to four magnetic write heads indicated at 36. Information is read out of the information band by means of an information read amplifier 38 having four amplification channels coupled respectively to four magnetic read heads indicated at 40.

When the first punch card is started through the card reader 12, as by operation of a start control 42, it passes through the first reading station of the card reader 12 where suitable electrical brushes detect the presence of a punch pattern indicative of a particular format control to be used in conjunction with that card. The format control information must be previously punched on the card for selecting one of the possible formats available in the buffer input unit. The format information detected by the brushes in the card reader 12 at the first reading station is transferred to a format storage and control circuit 44 that actuates the format select circuit 46 to select one of the five format bands previously established on the drum 30.

The format bands can be recorded on the drum of the input buffer units in any desired manner by the operator. Generally, the format bands are recorded on the drums by information set up in the computer 10 and read out through the buffer control unit 20 to format write amplifiers, such as indicated at 47, in each of the buffer units. However, the format information bits may be recorded directly on the drum by manually indexing the drum through each of the 320 information positions, and recording at each position the desired format instruction for that position according to any predetermined format plan.

As the punch card is fed into the second reading station of the card reader 12, each row is read out in parallel to a shifting register 48, which stores simultaneously punch information for each of the eighty column positions for the particular row passing under the reading brushes in the card reader 12.

As each row passes under the reading brushes in the card reader 12, a pulse, referred to as a row pulse, is generated by the card reader 12. The row pulses are fed to a control circuit 50 which actuates a row counter circuit 52. The control circuit 50 establishes a particular count on the row counter for each particular row being shifted onto the shifting register 48. The row counter 52, in turn, controls a gating circuit 54, the row counter establishing a particular gating pattern in the circuit 54 such that when a pulse is applied to the gating circuit 54, as from the output of the shifting register 48, output pulses are fed through selected ones of the channels of the information write amplifier 34 onto the information tracks of the drum 30. For each row on the punch card there is provided a corresponding binary-coded digit as established by the row counter 52 and gating circuit 54. This digit is recorded on the drum by each output pulse from the shifting register 48.

The shifting out of each row of information stored on the shifting register 48 in serial form is provided by shifting pulses derived from the timing generator 33 and gated to the shifting register 48 through a control circuit 56. As pointed out above, the circumference of the drum is divided into 320 information positions. This means that the eighty columns in the original punch card can be spread out into 320 positions on the magnetic drum. However, since the alphanumeric information on the cards involves an overpunch, that is, two punches in one column, one in the zone rows of 12, 11 and 0, and one in the numeric rows of 1 through 9, two information positions must be provided on the drum for each column on the card. Thus, the eighty columns on the card reader may be actually spread out into one hundred and sixty information digits on the drum. This function is carried out by the control circuit 56 under the control of format information derived from the selected format band on the drum and under the control of the control circuit 50 and row counter 52 in a manner to be more specifically described hereinafter.

Suffice it to say for the present general description of the operation of the buffer input unit, the control circuit 56 normally gates every other buffer pulse from the timing generator 33 to the shifting register 48. If the row counter 52 indicates that a zone row is on the shifting register 48, one set of pulses comprising every other buffer pulse is gated to the shifting register 48. If the row counter 52 indicates that a numeric row is stored on the shifting register 48, another set of buffer pulses comprising the alternate buffer pulses is gated to the shifting register 48. In this way, an interlacing of zone and numeric information digits is provided on the buffer drum 30, so that each column of information on the punch card has associated with it a zone position and a numeric information position on the buffer drum 30.

Spreading out of the eighty columns into the one hundred and sixty digit positions on the buffer drum is achieved through the format control. As pointed out above, one of five pairs of format tracks on the drum are selected by the format select circuit 46 in response to punched information on the card being read. The format select circuit 46 gates a selected pair of read heads to a format read amplifier 58 having two channels of amplification. By virtue of the double tracks for each format band, any one of four format commands can be stored in binary form in each information position around the circumference of the drum in each format band. The four commands used are the number 0 command for "Insert Zero," the number 1 command for "Transfer Alphabetic," the number 2 command for "Replace by Zero," and the number 3 command for "Delete Digit,"

The output from the format read amplifier 58 is connected to a format delay circuit 60. The two format channels are designated on the drawings as F and F′, where F′ represents the most significant binary digit of the format control number. The subscripts 1, 2 and 3 indicate different amounts of delay introduced by the format delay 60 in units of delay necessary to provide the proper sequence of operation and allow for the time necessary for information to move through the buffer unit, buffer control, and computer.

For any command except "Insert Zero," as derived from the format band through the select circuit 46, amplifier 58, and format delay 60, the control circuit 56 actuates the shifting register 48 from the buffer pulses received from the timing generator 33 in the manner above described. However, for the command "Insert Zero" when derived from the format control band, the control circuit 56 does not gate the associated timing buffer pulse from the timing generator 33 to the shifting register 48. Thus, with the "Insert Zero" command, no information is shifted onto the information tracks of the drum 30, so that a zero results at the corresponding information position on the buffer drum. Except in the case of sign information, zeros are never inserted between the zone and numeric positions comprising one punch card character.

Figure 6:
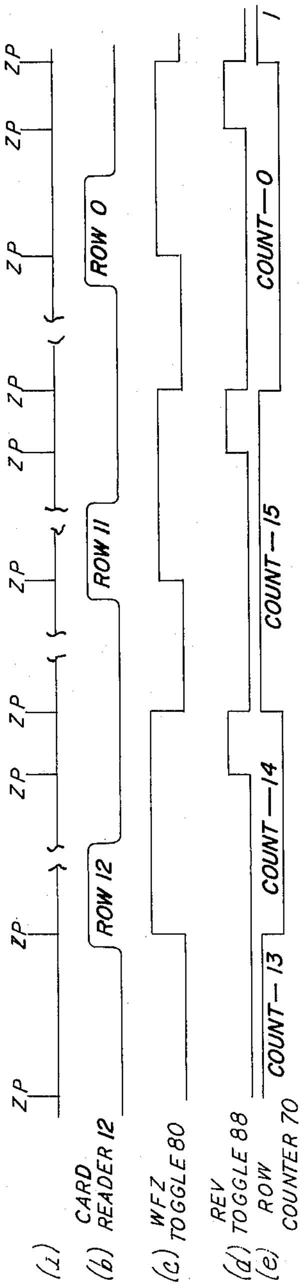
FIG. 6 is a timing diagram showing the sequence of operation of the various circuits in the diagram of FIG. 5.
Figure 5:
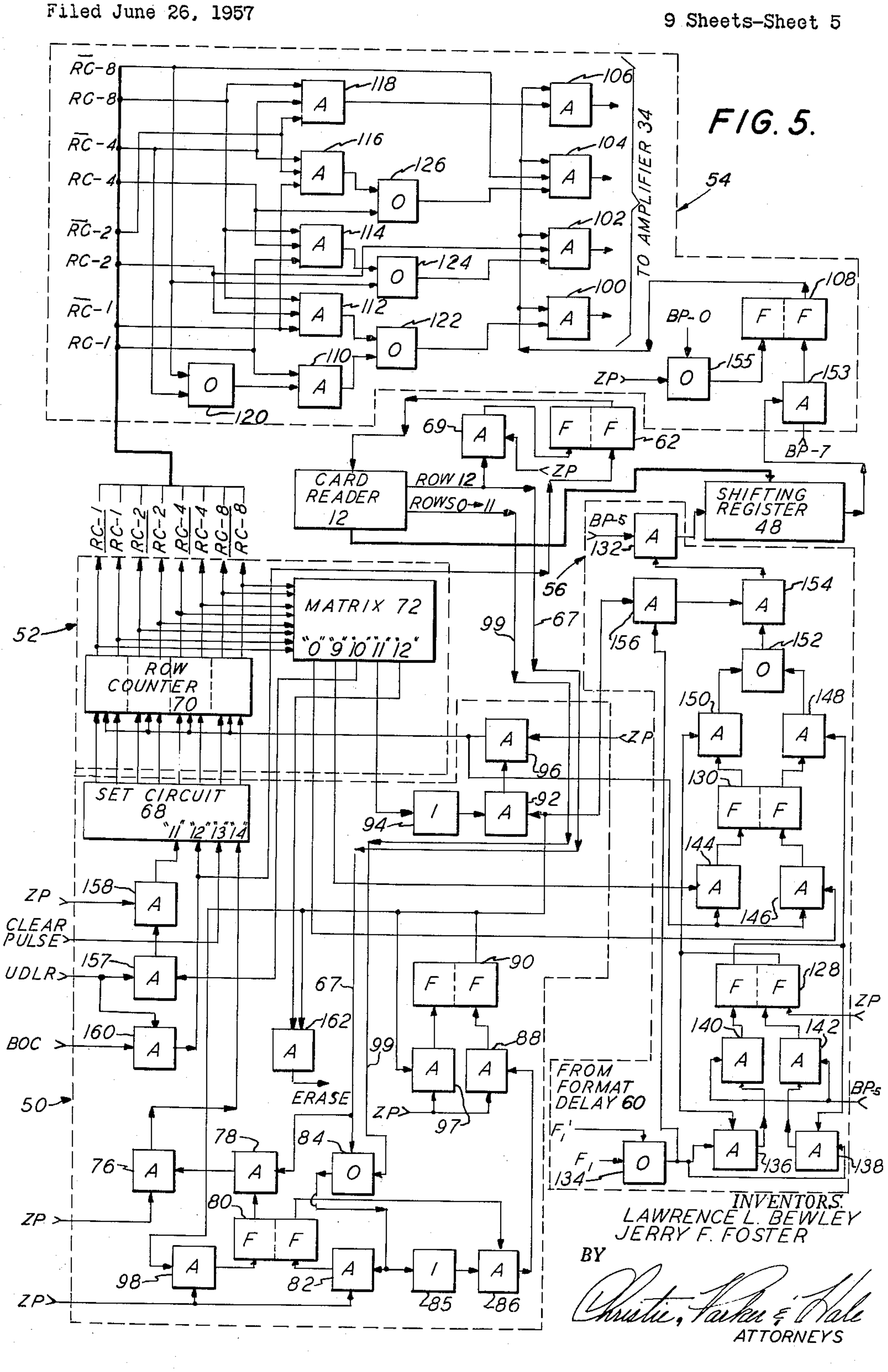
FIG. 5 is a more detailed block diagram showing the operating logic of the circuit for translating from a card reading machine to the buffer storage drum in the buffer input unit.

For a more complete understanding of the construction and operation of the buffer input unit, consideration is directed to FIGS. 5 and 6. The card reader 12 is started in operation by a flip-flop or toggle 62. The flip-flop 62 may be initially triggered by manually closing a switch or by a buffer command pulse BOC from the buffer control unit 20 in response to a computer command in a manner hereinafter more fully described. With the toggle 62 in the "on" condition, the first punch card begins to feed through the card reader 12 where the format information is first read off into the format storage and control circuit 44. (See FIG. 4.) The format information may either appear on the punch card as selected overpunches in one row or as selected punches in one column. In either event, the circuit 44 stores the information in binary form on a group of storage flip-flops from which a gating circuit forming part of the format select circuit 46 can be actuated to select and couple one pair of format read heads to the amplifier 58.

It should be noted that in all the drawings, toggles or flip-flops circuits are indicated by letters F—F in a block, The two stable conditions of the toggles, which are standard bi-stable multivibrators, are referred to hereinafter as the "off" condition and the "on" condition. By the convention followed on the drawings, a pulse to the lower right-hand side of the block triggers the toggle on, raising the output from the upper right-hand side to a high level potential according to so-called "positive logic."

The card then proceeds under operation of the card reader 12 to the second reading station, the 12-row arriving first. However, it should be noted that the circuit can be operated equally as well, with proper modification, with a card reader in which the card arrives with the 9-row first. As the card moves under the second reading station, a digit pulse is put out by the reader 12 (see FIG. 6*b*) over a separate row 12 output line 67. This pulse gates on an *and* circuit 69 so that the next zero pulse ZP from the generator 33 triggers off the start toggle 62. This means the reader will automatically stop after the card has fed through the machine. Only resetting of the start toggle can initiate the feeding of the next card.

The control circuit 50 includes a conventional parallel set circuit 68 for pre-setting a binary counter 70 (referred to as the row counter) in the counting circuit 52 to any desired count condition from a set pulse fed into the set circuit 68 over a selected input line. Thus, a clearing pulse is initially fed to the set circuit 68 for setting the counter 70 to the count 13 condition. The counter 70 is of conventional type comprising four toggles which can be set to the binary equivalent of the decimal numbers 0 through 15, or stepped by a stepping pulse to advance one digit per pulse. The "clear" pulse is a locally-generated pulse which is fed to all the toggles throughout the buffer unit to pre-set them to their desired initial condition. The "clear" pulse may be generated by a manual switch or by the buffer control unit 20.

With the row counter 70 set by the "clear" pulse at the 13 condition (see FIG. 6*e*), the next zero pulse ZP from the magnetic drum 30 and pulse generator 33 following the start of the row-12 pulse from the card reader 12 is gated through an *and* circuit 76 to set the row counter 70 from the count 13 condition to the count 14 condition. The *and* circuit 76 is gated open by the row-12 pulse from the card reader 12 through an *and* circuit 78 which is initially gated open by the pre-set condition of a toggle 80. The toggle 80 will hereinafter be referred to as the "Wait for Zero" or WFZ toggle.

The zero pulse ZP, at the same time it sets the row counter from the count-13 condition to the count-14 condition, also triggers on the WFZ toggle 80 (see FIG. 6*c*). This is accomplished by coupling the zero pulse ZP through an *and* circuit 82 which is gated open by the row-12 pulse. The row-12 pulse is coupled to the *and* circuit 82 by the line 67 from the card reader 12 through an *or* circuit 84. The zero pulse ZP, by triggering on the WFZ toggle 80, closes the *and* circuit 78.

The row-12 pulse from the card reader 12 at the same time is inverted by an inverter 85 after passing through the *or* circuit 84. An *and* circuit 86 coupled to the output of the inverter 85 and to the WFZ toggle 80, gates open an *and* circuit 88 after the end of the row-12 pulse from the card reader 12 and while the WFZ toggle 80 is in its "on" condition.

A zero pulse ZP is also coupled by the *and* circuit 88 to a toggle 90. Thus, the first zero pulse following the end of the row-12 pulse from the card reader 12 triggers the toggle 90, hereinafter referred to as the "Revolution" or Rev toggle, to its "on" condition as shown in FIG. 6*d*.

Once the Rev toggle 90 is triggered on, it gates open an *and* circuit 92. The other input to the *and* circuit 92 is derived from the "condition 11" output line of a diode matrix 72 through an inverter 94. The matrix is a standard diode circuit for converting from binary to decimal code. Thus, each condition of the counter energizes to a high potential level a corresponding output line from the matrix circuit 72. This particular output from the matrix 72 is energized when the row counter is in the count-11 condition. The output of the *and* circuit 92 is connected to an *and* circuit 96 to which zero pulses ZP are applied. By virtue of the inverter 94, the *and* circuit 92 gates open the *and* circuit 96 only when the matrix 72 does not energize the output line to the inverter 94. In other words, the *and* circuit 92 passes a signal to gate open the *and* circuit 96 only when the row counter 70 is in a row count condition other than 11. Since the row counter has now been set at 14 in the present sequence of events, the *and* circuit 96 is gated open to pass the next zero pulse ZP derived from the buffer drum 30. The output of the *and* circuit 96 is connected to the stepping input of the row counter 70. The row counter 70 is accordingly stepped to the count-15 condition.

At the same time, a zero pulse ZP is passed by an *and* circuit 97 to the Rev toggle 90 to trigger it back to its initial "off" condition, thereby gating closed the *and* circuit 92. The *and* circuit 97 is controlled by the Rev toggle 90 so as to be gated open only when the Rev toggle 90 has been triggered to its "on" condition by a zero pulse ZP passed by the *and* circuit 88.

It should be noted that the Rev toggle 90 also controls an *and* circuit 98 which gates zero pulses ZP to the WFZ toggle 80 to return it to its initial "off" condition following a row pulse from the card reader 12.

The next row pulse from the card reader 12, generated when the row 11 of the punch card passes under the reading brushes, is also coupled to the *or* circuit 84 by a separate output line 99, setting up the same chain of events as above-described in connection with the first row pulse. Thus, as shown in FIG. 6, the first zero pulse ZP following the start of the row 11 pulse triggers the WFZ toggle 80 on, opening the *and* circuit 86 after the end of the row pulse 11. At the end of the row pulse 11, the *and* circuit 88 is gated open to pass the next zero pulse ZP to the Rev toggle 90 to gate open the *and* circuit 96. The next zero pulse steps the row counter 70 to the next count condition, which in the case of the row 11 digit pulse from the card reader 12 would be the count 0 condition on the row counter 70. At the same time, a zero pulse triggers the Rev toggle 90 back to its initial condition and the circuit is ready for the next row pulse from the card reader 12. Thus, each row pulse from the card reader 12 advances the row counter ahead by one count. By deriving the first row pulse from the card reader 12 on a separate line 67 from the remaining row pulses, the *and* circuit 76 is gated open only by the first row pulse for setting the row counter to the count 14 condition initially.

It will be appreciated from the above description and by the diagrams of FIG. 6, that the Rev toggle 90 is triggered on for an interval of time between two successive zero pulses, i.e., the interval of time corresponding to one revolution of the buffer drum. It is during this interval of time when the Rev toggle 90 is set to its "on" condition that the previous row read out of the card reader 12 onto the shifting register 48 is shifted out of the shifting register in serial fashion onto the buffer drum. This is accomplished in the following manner.

A pair of output lines from each of the four toggles comprising the row counter 70 are connected to the gating circuit 54, these lines from the row counter being designated, for the purpose of explanation, as RC–1, $\overline{\text{RC}}$–1, RC–2, $\overline{\text{RC}}$–2, RC–4, $\overline{\text{RC}}$–4, RC–8 and $\overline{\text{RC}}$–8. The toggles in the row counter set the levels on these output lines. When the RC–1 line is at a high potential level, the $\overline{\text{RC}}$–1 line is at a low level, and the same for the RC–2, RC–4 and RC–8 lines. The gating circuit 54 includes four *and* circuits, 100, 102, 104 and 106. These four *and* circuits gate pulses generated by a toggle 108, actuated in turn by the shifting register 48 in a manner hereinafter more fully described, to the respective 4 channels of amplification in the information write amplifier 34 for recording on the information tracks on the buffer drum 30. The gating circuit 54 establishes a particular pattern on the four *and* circuits 100, 102, 104, 106 according to the count condition on the row counter 70. A binary-coded decimal number recorded on the buffer drum with each pulse from the toggle 108 is established by the gating circuit 54 from the row counter 70 according to the buffer input code shown in FIG. 2. If the row counter 70 is set at any of the count conditions 1 through 9, corresponding to the numeric rows 1 through 9 of the punch card, a 1 through 9 respectively is established on the buffer drum for each pulse from the toggle 108. However, if the row counter 70 is at count conditions 0, 14 or 15, corresponding to the zone rows 0, 11 or 12 respectively on the punch card, the gating circuit 54 establishes correspondingly on the drum a binary-coded 4 for the count-0 condition, a binary-coded 1 for the count-14 condition, and a binary-coded 2 for the count-15 condition.

This code translation is accomplished in the gating circuit 54 by five *and* circuits, indicated at 110, 112, 114, 116 and 118, and by four *or* circuits indicated at 120, 122, 124, and 126, connected in the manner shown in FIG. 5. For example, consider the action of the gating circuit 54 with the row counter set at 0, corresponding to the row 0 on the punch card. With the counter 70 at the 0 condition, the $\overline{\text{RC}}$–1, $\overline{\text{RC}}$–2, $\overline{\text{RC}}$–4 and $\overline{\text{RC}}$–8 output leads are raised to their highest potential level. The $\overline{\text{RC}}$–1, $\overline{\text{RC}}$–2 and $\overline{\text{RC}}$–4 leads are all connected to the *and* circuit 116, and since these leads from the row counter are at their highest potential level, the output from the *and* circuit 116 is raised to a high potential level. As a result, the output from the *or* circuit 126 connected to the *and* circuit 116 is raised to a high potential level. The output of the *or* circuit 126 and the $\overline{\text{RC}}$–8 lead from the row counter 70 are connected to the *and* circuit 104. Since both these leads are at a high potential level when the row counter is at its count 0 condition, a positive pulse from the toggle 108 is passed by the *and* circuit 104 and recorded as a pulse on the buffer drum 30. Since the other *and* circuits 100, 102 and 106 are not gated open with the row counter in its 0 condition, a pulse pattern of 0100, starting with the most significant digit first, is recorded at a particular information position on the buffer drum. This is the binary equivalent of the decimal number 4, which according to the buffer code as set forth in FIG. 2 is the number a row 0 punch on the punch card is translated into on the buffer drum.

By similar analysis, it can be readily shown that the gating circuit of FIG. 5 translates each condition of the row counter for a given row on the punch card to a binary-coded decimal number on the buffer drum corresponding to the predetermined buffer code as set forth in the table of FIG. 2.

As pointed out above, each column on the punch card has two corresponding information positions on the buffer drum 30, a zone position and a numeric position. This is to permit the transfer of alphabetic characters which involve two punches in one column on the punch card, one punch in a zone row and at least one punch in a numeric row. The purpose of the control circuit 56 on the shifting input to the shifting register 48 is to insure that the numeric row digits are transferred onto the buffer drum in the numeric information positions and the zone row digits are transferred onto the buffer drum in the zone information positions. To this end the control circuit 56 is provided with two toggles, a numeric or Nu toggle 128, and a row toggle or RT toggle 130. These toggles combine to control an *and* circuit 132 for gating buffer pulses to the shifting register 48 at the proper time to transfer row digit information established by the row counter 70 and gating circuit 54 onto the buffer drum 30.

One other function of the control circuit 56 is to prevent shifting of the shifting register 48, as it otherwise would do in the normal course of events, when the selected format band puts out a command that a zero is to be inserted at the particular information position on the buffer drum. To this end, binary pulse information from the selected format tracks is amplified by the format read amplifier 58, delayed a proper amount by the format delay 60, and fed to an *or* circuit 134 (see FIG. 5) in the control circuit 56. For any format command except the "Insert Zero" command, a pulse is derived from one or the other of the format tracks which is passed by the *or* circuit 134 to a pair of *and* circuits 136 and 138. One or the other of these *and* circuits 136 and 138 is gated open by the Nu toggle 128, which is connected to the *and* circuits 136 and 138 as shown in FIG. 5. As a result, one or the other of a pair of *and* circuits 140 and 142, coupled to the output of the *and* circuits 136 and 138 respectively, gate a buffer pulse BP–5 to one side or the other, respectively, of the Nu toggle 128. Thus, it will be seen that the Nu toggle 128 is alternately triggered from one stable condition to the other and back again by successive buffer pulses, as long as the format command is not "Insert Zero."

The RT toggle 130 is arranged to be triggered to one stable condition or the other depending upon whether a zone row or a numeric row is being read from the punch card. This is accomplished by a pair of *and* circuits 144 and 146 connected to opposite sides of the RT toggle 130. These *and* circuits receive row stepping pulses from the output of the *and* circuit 96, and are respectively gated open by the row counter 70 through the matrix circuit 72 when the row counter is in its count-9 condition, or its count-0 condition.

For instance, when the row counter is in its count-0 condition, the next stepping pulse from the *and* circuit 96 steps the row counter to its count-1 condition, corresponding to the numeric row 1 on the punch card. At the same time this stepping pulse is passed by the *and* circuit 146 to trigger the RT toggle 130 to its opposite stable condition, thereby gating open an *and* circuit 148 connected to one side of both the row toggle 130 and the numeric toggle 128.

On the other hand, when the row counter reaches its count-9 condition, corresponding to the row 9 of the punch card, the next stepping pulse passed by the *and* circuit 96 is passed by the *and* circuit 144 to flip the toggle 130 to its initial stable condition, gating open an *and* circuit 150 connected to the opposite side of both the row toggle 130 and the numeric toggle 128. Thus, it will be seen that the row toggle 130 gates open the *and* circuit 148 during the time numeric rows are being read from the punch card, and gates open the *and* circuit 150 during the time zone rows are being read from the punch card.

The *and* circuits 148 and 150 are controlled by the numeric toggle 128, so that for only one condition of the toggle 128 and one condition of the toggle 130 can the *and* circuit 148 produce a high level output. The opposite condition of the numeric toggle 128 and the row toggle 130 is required for the *and* circuit 150 to produce a high level output. Therefore, since the numeric toggle 128 is normally flipped for each buffer pulse from the drum, corresponding to each successive information position on the buffer drum, and since the row toggle 130 normally is not flipped until the row counter goes from zone to numeric, or from numeric to zone rows, one or the other of the *and* circuits 148 or 150 will normally be gated open and closed with successive buffer pulses from the buffer drum.

The respective *and* circuits 148 and 150 are connected to an *or* circuit 152 through which they respectively control an *and* circuit 154. The other input to the *and* circuit 154 is derived from an *and* circuit 156 connected respectively to the Rev toggle 90 and to the *or* circuit 134. By this arrangement, when the format command is not "Insert Zero" and when the Rev toggle is set in the "on" condition between two zero pulses, the *and* circuit 156 supplies a high level output to the *and* circuit 154. As a result, an output from the *or* circuit 152 gates open the *and* circuit 132 to permit the next buffer pulse derived from the buffer drum 30 to pass to the shifting input of the shifting register 48.

From the above description, it will be seen that the shifting register 48 is shifted only when the Rev toggle is in the "on" condition, when the format band does not call for an "Insert Zero" operation, and the row toggle 130 and numeric toggle 128 indicate that the proper information position on the buffer drum, namely, a zone position or a numeric position, depending upon which row is stored in the shifting register, is passing under the recording heads.

As each shifting pulse is applied to the shifting register 48, a pulse or no-pulse is shifted out to an *and* circuit 153 to which are coupled delayed buffer pulses BP–7. The output from the *and* circuit 153 triggers on the toggle 108 when a pulse is shifted out of the register 48. The next buffer pulse BP–0 or zero pulse ZP, connected through an *or* circuit 155, triggers off the toggle 108. A positive square pulse is thereby derived from the toggle in response to a pulse from the register 48, indicating a punch in a particular column of the card. This positive pulse is fed to each of the *and* circuits 100, 102, 104 and 106 to gate the pattern established by the gating circuit 54 from the row counter 52 onto the buffer drum.

When the Rev toggle 90 is turned off following the reading out of row 9 from the punch card, the row counter is stepped to count condition 10. At this time all the information has been transferred from the particular card passing through the card reader 12 onto the buffer drum where it is stored until called for by the computer 10. When the computer 10 is ready for information from a particular input buffer unit, it transmits a command to the buffer control unit 20. As hereinafter more fully described, the buffer control unit 20 designates one of the buffer input units for transfer of information into the computer. This is done by a toggle in the buffer control unit which raises the level of a unit designation line indicated as UDLR, which goes to each of the buffer input units and associated punch card readers. Thus, when the computer is ready to receive information from the buffer drum, the particular unit designation line from the buffer control unit 20 is raised in potential. This gates open *and* circuits 157 and 160 in the control circuit 50. The *and* circuit 157 also is connected to the matrix circuit 72 by the output line therefrom which is energized when the row counter 70 is in the 10 count position. The *and* circuit 157 controls an *and* circuit 158 which gates a zero pulse ZP to the counter set circuit 68 for setting the row counter to the count-11 condition. While the row counter is in the count condition 11, information is fed from the buffer drum 30 into the computer through the buffer control unit 20 in a manner hereafter described in detail.

To start the next card reading sequence, a buffer output control pulse generated by the buffer control unit 20, designated as the BOC pulse, is coupled by the *and* circuit 160, gated open by the unit designation line UDLR from the buffer control unit 20, to the setting circuit 68 to set the row counter in the count-12 condition. At the same time that the buffer output control pulse BOC sets the row counter 70 to the 12 count condition, it also triggers the Rev toggle 90 to its "on" condition and triggers the card reader starting control toggle 62 to start the next card feeding into the card reader 12. With the row counter 70 at the count-12 condition, an output line from the matrix circuit 72 is raised in potential. This output line together with the output from the Rev toggle 90 is applied to an *and* circuit 162, the output of the *and* circuit 162 being coupled to the information write amplifier 34 to pass an erase current through the recording head 36. Thus, with the row counter 70 in the count-12 condition, the previous card information is erased off the buffer drum in preparation for information derived from the next card being fed into the card reader 12.

It should be pointed out in connection with the conversion to the buffer code on the drum, the characters +0 and −0 in the IBM code involve punches in the 12 and 0 rows and the 11 and 0 rows respectively, as shown in the table of FIG. 2. Since these punches are all in zone rows, they will be recorded in the same zone position on the drum on different revolutions of the drum. The 12-row punch records the digit 1 on the first revolution and the 0-row punch records the digit 4 on the next revolution, so that the resulting digit recorded at the particular information position on the drum is a 5, i.e., the sum of 1 and 4. Similarly, the 11-row punch and 0-row punch result in a 6 being recorded in a zone position on the drum. Of course, a zero digit is automatically recorded in the numeric position, since there is no punch for the +0 and −0 characters in the numeric rows of the punch card.

Some of the characters, such as the decimal point, involve two numeric punches in one column in addition to a zone punch. The two numeric punches add together on successive revolutions of the drum to record their sum. Thus, an 8-row punch and a 3-row punch record as an 11 digit on the drum in the numeric information position for that column.

The buffer control unit 20 (see FIG. 3) performs a number of functions, some of which have been already mentioned. For example, one function of the buffer control unit is to receive commands from the computer, interpret these commands and select and control one of the buffer input units accordingly. Another function of the buffer control unit 20 is to translate information stored on an input buffer drum into digital words of the proper length and proper code for transmission into the computer 10. This translation function of the buffer control unit is under the control of selected format bands on the designated buffer drum.

Referring to FIG. 2, the digits, letters and characters stored on the buffer drum according to the buffer code indicated in the center column are translated by the buffer control unit 20 to the computer code as the corresponding decimal digits shown in the right-hand column. In selecting a computer code, the objective was to have the code provide the simplest translating function and still maintain a code with a collating sequence, i.e., a code in which the zone digits increase in numerical value for the order of characters appearing in the left-hand column of FIG. 2, a limitation imposed by military standardization policy.

Figure 7:
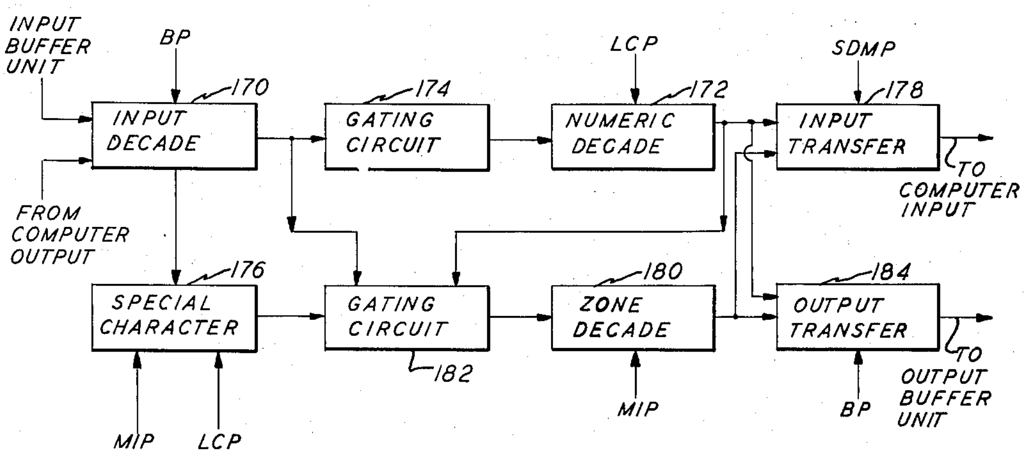
FIG. 7 is a block diagram of the main components of the translating circuit in the buffer control unit.

Referring to FIG. 7, there is shown in block diagram form the components of the buffer control unit 20 which comprise the translator for converting from the buffer code to the computer code, or vice versa, for converting from the computer code to the buffer code, as set forth in the table of FIG. 2. In converting from buffer code to computer code, an input decade 170 receives the binary-coded digit information derived from the buffer drum through the information read amplifier 38. Since numeric and zone information appears in alternate positions on the buffer drum, the first digit transferred to the input decade 170 is numeric, followed by zone, the next numeric, etc. When a change pulse, designated LCP, generated by the buffer control unit in a manner hereafter described, is received by a numeric decade 172 connected to the input decade 170 by a gating circuit 174, the numeric information stored on the input decade 170 is transferred to the numeric decade 172. The gating circuit 174, in a manner hereafter more fully described, converts the digits 11 and 12 stored on the input decade 170 to the digits 3 and 4 respectively, stored in binary-coded form on the numeric decade 172. An examination of the buffer code and computer code as set forth in FIG. 2 shows this to be the only modification required to convert or translate from the buffer code to the computer code as far as the numeric information is concerned, all the other numeric digits being translated without modification into the computer.

A buffer pulse, designated $BP_S$, derived from the designated input buffer drum then clears the input decade 170 so that it can receive the next information bit from the buffer drum, which is a zone information digit. It should be noted at this point that a special character toggle 176 is triggered on by the change pulse LCP if the initial numeric information digit stored in the input decade 170 was a 0, 11 or 12. Otherwise, the toggle 176 stays in its initial condition.

The numeric information digit stored on the numeric decade 172 is transferred into an input storage register in the computer by an input transfer circuit 178 triggered by a shift digit master pulse, designated SDMP, generated by the buffer control unit 20 in a manner hereinafter described.

The following zone information digit is next transferred to the input decade 170 from the buffer drum by the information read amplifier 38. The zone information digit stored in the input decade 170 is transferred to a zone decade 180 through a gating circuit 182 when an input pulse, designated MIP and generated by the buffer control unit, triggers the zone decade 180. The gating circuit 182 is controlled by the previous numeric information digit stored in the numeric decade 172 and by the condition of the special character toggle 176 to change the binary-coded zone information digit from its buffer code value in the input decade 170 to its computer code value in the zone decade 180. The gating circuit 182, which is hereinafter described in more detail, is arranged to convert the zone information digits from the buffer drum into the zone digits required for the computer, according to the buffer code and computer code columns of FIG. 2. The zone information digit stored on the zone decade 180 is then transferred to the computer by the next SDMP pulse at the input transfer circuit 178.

The transfer circuit of FIG. 7 may also be used to convert information from the computer onto the buffer drum of an output buffer unit. This is described more fully in co-pending application Serial No. 668,214 filed June 26, 1957. The binary-coded digits from the computer are fed through the input decade 170 and are transferred via the numeric decade 172 and zone decade 180 to the output buffer units through an output transfer unit 184.

Figure 8:
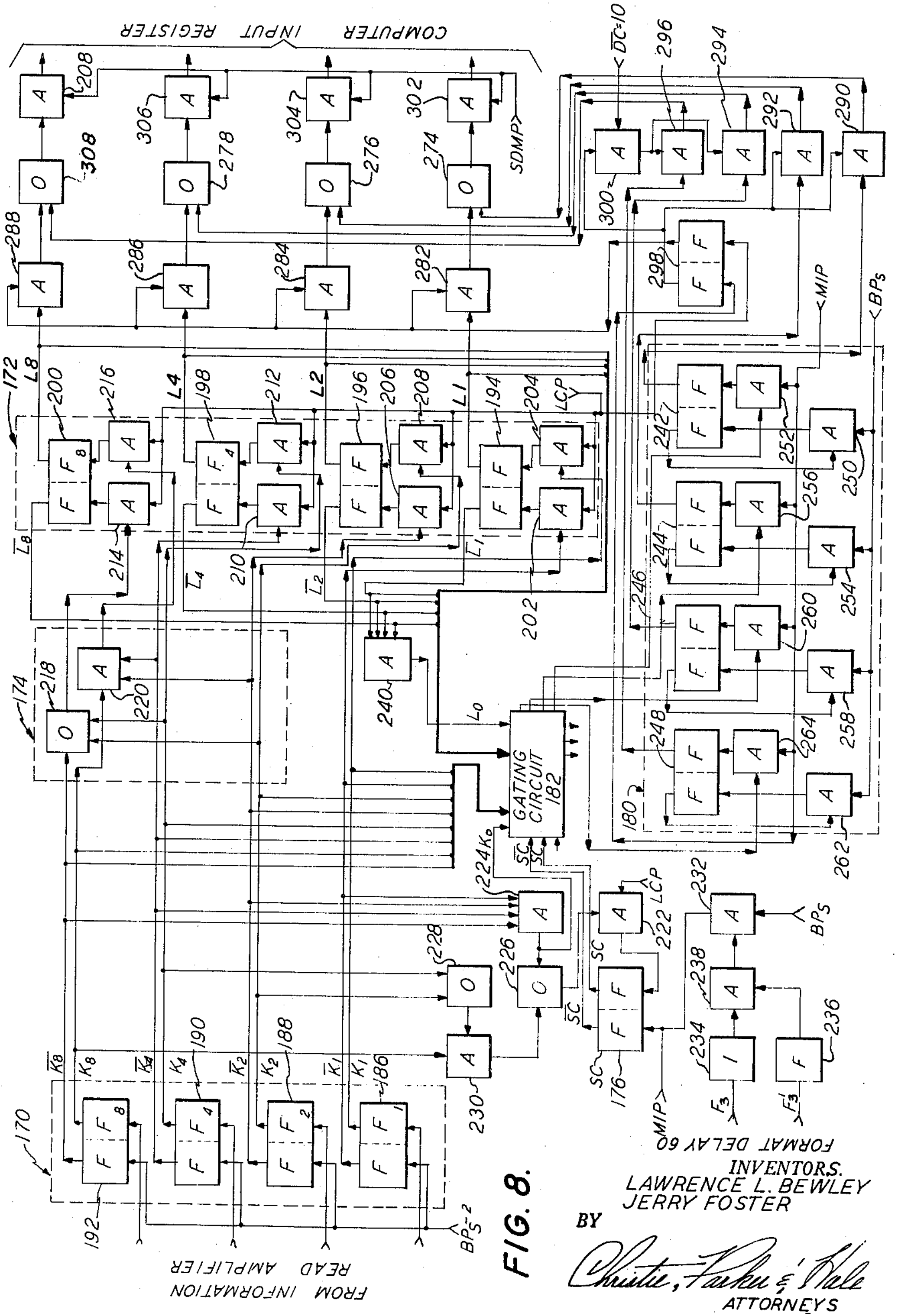
FIG. 8 is a more detailed block diagram of the translator of FIG. 7 showing the operating logic of the circuit for translating from the input buffer drum to the computer.

Referring to FIG. 8, the transfer circuit for translating from a buffer input drum to the computer is shown in detail. The input decade 170 comprises four toggles, indicated at 186, 188, 190 and 192. These toggles are all set to their initial "off" condition by a delayed buffer pulse $BP_S$–2 from the selected buffer input unit which is fed to all four of the toggles. The output of the four channels from the information read amplifier 38 is connected respectively to the four toggles such that a pulse out of any of the four channels triggers a corresponding toggle to its "on" condition.

The numeric decade 172 similarly comprises four toggles, indicated at 194, 196, 198 and 200. Each of these toggles is triggered to its "off" or "on" condition by the control pulse LCP gated to either side of the toggle 194 by *and* circuits 202 and 204, to either side of the toggle 196 by *and* circuits 206 and 208, to either side of the toggle 198 by *and* circuits 210 and 212, and to either side of the toggle 200 by *and* circuits 214 and 216. The *and* circuits 202 and 204 are gated "on" respectively by the "off" condition and the "on" condition of the toggle 186 in the input decade 170, the *and* circuit 204 being connected to one output side of the toggle 186 by a line designated $K_1$ and the *and* circuit 202 being connected to the opposite output side of the toggle 186 by a line designated $\overline{K}_1$. Thus, when the toggle 186 is in its "off" condition, the *and* circuit 202 passes an LCP pulse to trigger the toggle 194 to its "off" condition.

Similarly, the *and* circuits 206 and 208 are controlled respectively by the toggle 188 by a line $\overline{K}_2$ and a line $K_2$. The *and* circuits 210 and 212 are respectively controlled from the toggle 190 by lines designated $\overline{K}_4$ and $K_4$, and the *and* circuits 214 and 216 are respectively controlled from the toggle 192 by lines $\overline{K}_8$ and $K_8$ connected respectively through an *or* circuit 218 and an *and* circuit 220 which comprise the gating circuit 174. The and circuit 220 is also connected to the $\overline{K}_2$ line from toggle 188 and to the $\overline{K}_4$ line from the toggle 190. The *or* circuit 218 is connected to the $K_2$ line from the toggle 188 and to the $K_4$ line from the toggle 190.

It will be seen on inspection of the circuit as thus far described that when numeric information digits having a value of 0 through 9 are stored in binary-coded form in the toggles of the input decade 170, that appropriate *and* circuits in the numeric decade 172 will be gated open so that the next LCP pulse will trigger the toggles in the numeric decade 172 to set up the same digit in binary-coded form on the numeric decade 172. However, when the numeric information digits 11 or 12 are stored in binary-coded form on the toggles of the input decade 170, because of the gating circuit 174 they will be transferred to the numeric decade 172 as a 3 or 4 respectively.

For any of the digits 0 through 9 stored on the input decade 170, the toggle 192 in the input decade 170 which stores the most significant digit is not triggered on at the same time with the toggles 188 and 190. Thus, the *and* circuit 220 in the gating circuit 174, being connected to the toggles 188 and 190 so as to bias to a high level when these toggles are in their "off" condition, is normally gated off for the digits 8 and 9. As a result, the *and* circuit 216 is gated open, and the toggle 200 is triggered to its "on" condition in response to an LCP pulse for the 8 and 9 digits. However, for the numbers 10 through 15 and, in particular, for the numbers 11 and 12 stored on the input decade 170, one or the other or both of the toggles 188 and 190 are triggered to their "on" condition. In this event the *and* circuit 220 is not gated on and as a result the *and* circuit 216 is not gated on and, therefore, the toggle 200 is not triggered to its "on" condition, even though the toggle 192 has been triggered to its "on" condition. By this means, 11 or 12 in the input decade 170 is stored as 3 or 4 respectively in the numeric decade 172.

Since the toggles in the numeric decade 172 remain in their previous condition unless modified by a change in the input decade 170, it is necessary to provide some means for returning the toggle 200 to its "off" condition when an 11 or 12 is received following an 8 or 9. This is accomplished by the *or* circuit 218 which is gated open by either of the toggles 188 or 190 when they are triggered to their "on" condition, as would be the case for either of the digits 11 or 12. The *or* circuit 218 is also connected to the $\overline{K}_8$ line of the toggle 192. Accordingly, the *and* circuit 214 is gated open when either of three conditions exist, namely, either the toggle 188 or the toggle 190 is triggered to the "on" condition, or the toggle 192 is triggered to its "off" condition. Thus, for any of these three conditions the toggle 200 is returned to its "off" condition to give the proper numeric designation on the numeric decade 172.

Figures 9, 10:
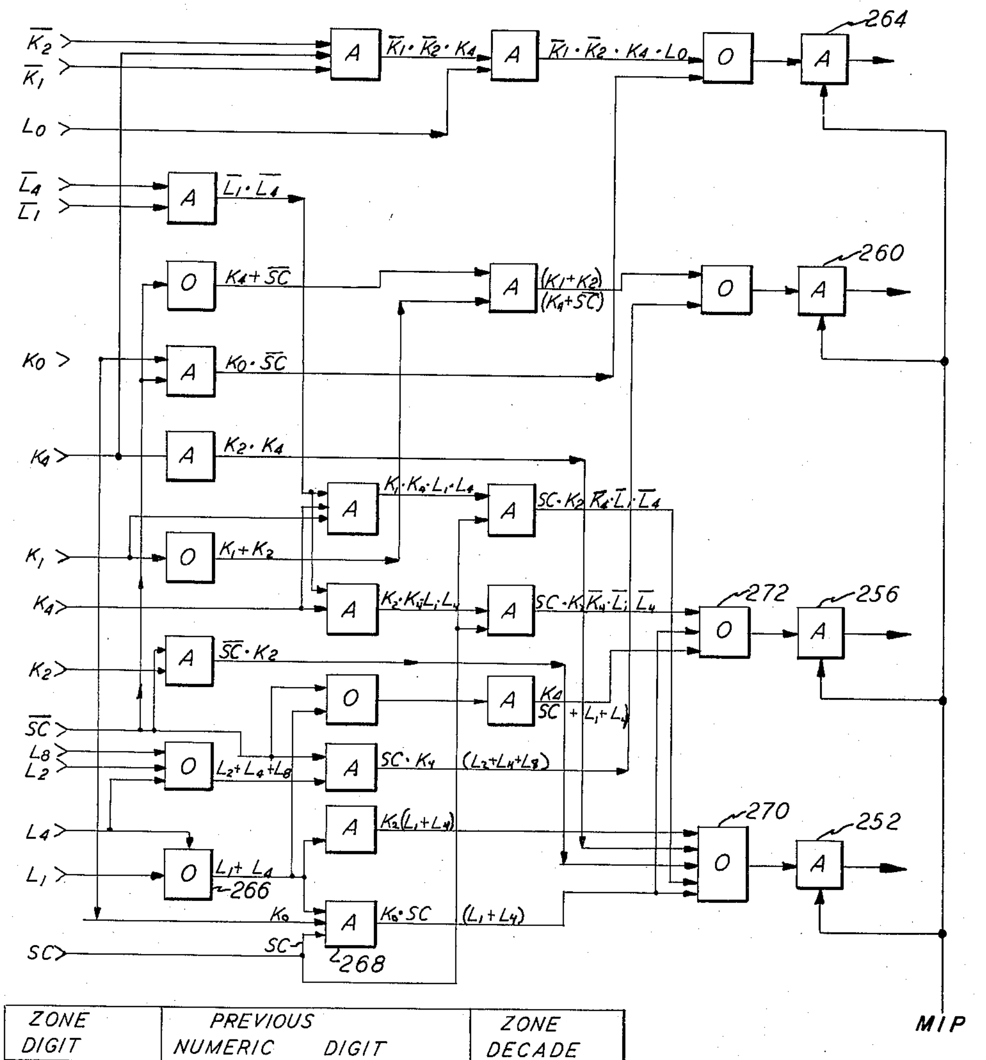
FIG. 9 is a table showing the translation zone information on input as performed by the translating circuit of FIG. 8.
FIG. 10 is a block diagram showing the operating logic of the gating circuit in the translator shown in FIG. 8.

In transferring the zone digits received in the input decade 170 from the input buffer drum 30 onto the zone decade 180, it will be seen by an examination of the corresponding zone digits in the buffer code and computer code as set forth in the table of FIG. 2 that a more involved translation problem is involved. FIG. 9 sets forth the translation of zone information from buffer code to computer code, showing how the translation can be made to depend on the previous numeric digit, keeping in mind that each digit, letter or special character stored as punches on the punched card is received from the buffer drum as a numeric digit followed by a zone digit. Thus, if the zone digit is a 0 and it follows a numeric digit of 0, the translator must establish a 0 on the zone decade 180. However, if the zone digit is a 0 and the previous numeric digit is a 1 through 9, then it is necessary to establish an 8 on the zone decade 180. Similarly, for each of the zone digits 1, 2, 4, 5 and 6, there is a corresponding digit transferred to the zone decade 180 depending upon the previous associated numeric digit, in the manner set forth in the table of FIG. 9. This translation is accomplished by the gating circuit 182. The gating circuit 182 receives the zone digit information from the input decade 170 and receives the previous numeric digit information from the numeric decade 172 and from the special character toggle 176.

The special character toggle 176 is arranged to be triggered on when the previous numeric digit received by the input decade 170 is one of the three special characters involving the numeric digits 0, 11 and 12. If any of these three numeric digits is stored on the input decade 170, an *and* circuit 222 is gated open passing an LCP pulse to the toggle 176 and triggering the toggle 176 to its "on" condition. It will be seen that if the input decade 170 is in its zero condition, i.e., with all the toggles in their "off" condition, by connecting respectively the lines $\overline{K}_1$, $\overline{K}_2$, $\overline{K}_4$ and $\overline{K}_8$ to an *and* circuit 224 and through an *or* circuit 226, that the *and* circuit 222 is gated open if a zero is received from the buffer drum onto the input decade 170. On the other hand, if an 11 or 12 is received on the input decade 170, one or the other of the toggles 188 or 190 is triggered on in addition to the triggering on of the toggle 192. By connecting the lines $K_2$ and $K_4$ from toggles 188 and 190 to an *or* circuit 228, which, in turn, controls an *and* circuit 230, it will be seen that when the toggle 192 and one or the other of the toggles 188 and 190 is triggered on, that the *and* circuit 222 is thereby gated on and the special character toggle 176 is triggered to its "on" condition. The special character toggle 176 is triggered off again during zone time by the MIP pulse, the same pulse that triggers the zone decade 180.

It should be noted that when a 0 is received from the buffer drum which resulted from a format command "Insert Zero," that the special character toggle 176 does not want to be triggered on. This is because the 0 resulting from the "Insert Zero" command has no zone-numeric significance, as does a 0 resulting from a card punch. For this reason, an *and* circuit 232 gates a buffer pulse $BP_s$ to the special character toggle 176 to trigger the toggle 176 off when the format command is an "Insert Zero." By means of inverter circuits 234 and 236 in each of the output channels $F_3$ and $F_3'$ from the format delay 60, an *and* circuit 238 can be made to gate open the *and* circuit 232 only when no pulse is received over the two channels from the format delay 60. In other words, the *and* circuit 238 gates open the *and* circuit 232 only in response to the format command "Insert Zero."

The gating circuit 182, in addition to being connected to the eight output lines from the input decade 170, is also connected to eight output lines from the toggles of the numeric decade 172, these output lines being designated $L_1$, $\overline{L}_1$ from the toggle 194, $L_2$, $\overline{L}_2$ from the toggle 196, $L_4$ and $\overline{L}_4$ from the toggle 198, and $L_8$, $\overline{L}_8$ from toggle 200. In addition, the gating circuit 182 is connected to the two output sides of the special character toggle 176 by the lines designated SC and $\overline{SC}$. Also, the gating circuit 182 is connected to the output of the *and* circuit 224 by a line designated $K_0$, which line, as was pointed out above, is raised to a high potential level when all of the four toggles of the input decade 170 are in their "off" condition, corresponding to an input digit of 0.

Similarly, the gating circuit 182 receives the output from an *and* circuit 240 by the lines $\overline{L}_1$, $\overline{L}_2$, $\overline{L}_4$ and $\overline{L}_8$ to the off side of the four toggles in the numeric decade 172. The line from the output of the *and* circuit 240, designated $L_0$, is thus raised to a high potential when all of the toggles of the numeric decade 172 are in their "off" condition, corresponding to an input numeric digit of 0.

The gating circuit 182 functions to selectively gate open any of four *and* circuits 252, 256, 260 and 264. These *and* circuits respectively gate MIP pulses from the buffer control unit 20 to each of the toggles 242, 244, 246 and 248, whereby the toggles are selectively triggered on according to the pattern set by the output of the gating circuit 182. The toggles of the decade 180 are reset by the next selected buffer pulse $BP_s$ gated to the toggles by four *and* circuits 250, 254, 258 and 262 respectively, the *and* circuits being gated open when the associated toggles are triggered on.

The gating circuit 182, as shown in detail in FIG. 10, comprises a plurality of *and* circuits and *or* circuits connected to carry out the logic required by the code transformation as set forth in the table of FIG. 9. The manner of designing such gating circuits using Boolean algebra is common practice in the computer art and is extensively described in the literature. (See, for example, "Arithmetic Operations In Digital Computers" by R. K. Richards, D. Van Nostrand & Co., Inc. 1955.) It is not believed necessary to go into the details of the gating circuit 182 to provide a complete understanding of the present invention. The manner of operation of the gating circuit 182 can readily be appreciated from the circuit of FIG. 10 by following the manner in which a selected zone digit is translated. By way of an example, a zone digit 0 following a numeric digit 11 (or 12) translates as a 3 on the zone decade 180 in the following manner.

The zone digit 0 sets the input decade 170 (FIG. 8) to zero, energizing the $K_0$ line to a high potential. At the same time, since the previous numeric digit was an 11 or 12, either the $L_1$ or the $L_4$ lines from the numeric decade 172 are also energized to a high potential. Also, since the previous numeric digit 11 (or 12) represents a special character, the special character toggle 176 has been triggered, energizing the SC line to a high potential. Accordingly, in the gating circuit 182, as shown in detail in FIG. 10, the $L_1$ line or the $L_4$ line raises the output of an *or* circuit 266 to a high potential level, the output of the *or* circuit 266 being connected to an *and* circuit 268 to which is also connected the $K_0$ line and the SC line. Since the three inputs to the *and* circuit 268 are raised to a high level potential, the output is accordingly raised to a high level potential. The output of the *and* circuit 268 is connected to an *or* circuit 270 which gates open the *and* circuit 252 in the zone decade 180 (FIG. 8) whereby the toggle 242 is triggered to the "on" condition by the next MIP pulse.

The output of the *and* circuit 268 is also connected to an *or* circuit 272 which gates open an *and* circuit 256 in the zone decade 180, whereby the toggle 244 is triggered to the "on" condition by the next MIP pulse. It can be seen from FIG. 10 that either of the other *and* circuits 260 and 264, controlling respectively the toggles 246 and 248, are gated on when a 0 is stored on the input decade 170 and a 3 (or 4) is stored on the numeric decade 172. Accordingly, a digit 3 is stored on the zone decade in the example just described, which is the result dictated by the code translation set forth in FIGS. 2 and 9.

Similarly, the pattern on each of the toggles of the zone decade 180 can be ascertained for each zone digit stored on the input decade and previous numeric digit stored on the numeric decade 172.

In order to couple alternately the digits stored on the numeric decade 172 and on the zone decade 180 to the computer input register, each of the four toggles in each of the decades is respectively connected to four *or* circuits 274, 276, 278 and 280. The four toggles in the numeric decade 172 are connected to the *or* circuits through respective *and* circuits 282, 284, 286 and 288. The four toggles of the zone decade 180, in turn, are connected to the respective *or* circuits through the four *and* circuits 290, 292, 294 and 296. These two sets of four *and* circuits are alternately gated open by a toggle 298 triggered in response to the LCP pulses and the MIP pulses generated in the buffer control unit 20. The *and* circuits 294 and 296 are gated open by the toggle 298 through an *and* circuit 300, which is normally gated open when sign information is being tranferred to the computer, the operation of the *and* circuit 300 and control thereof being hereinafter more fully described.

With the output of the four *or* circuits being alternately set by the toggles of the numeric decade 172 and the zone decade 180, the output of the four *or* circuits are gated to the four channels of the input register of the binary-coded decimal computer by four *and* circuits 302, 304, 306 and 308 respectively. These latter *and* circuits are gated on by the shift digit master pulse, designated SDMP, which is generated by the buffer control unit 20.

Figure 11:
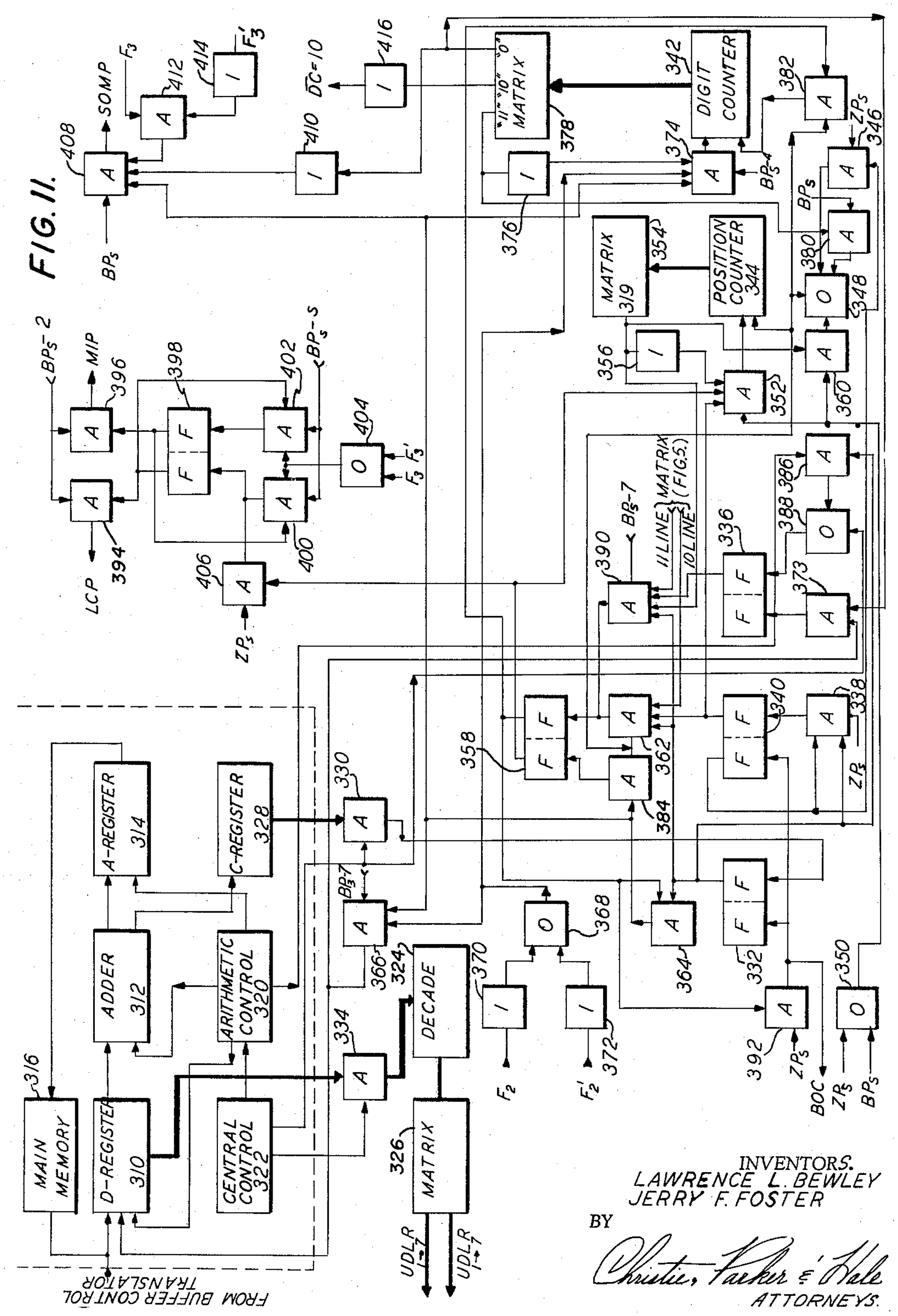
FIG. 11 is a block diagram of the control circuits in the buffer control unit, as particularly employed during the input function, and the associated computer.

Referring to FIG. 11, there is shown the portion of the buffer control unit 20 which generates the various control signals for use in controlling the buffer input units and the translating portion of the buffer control unit in conjunction with the main computer 10. In the preferred form of the computer 10 there is included a D-register 310 including four parallel channels for storing the four binary digits comprising each decimal digit stored in the register. The D-register 310 preferably includes ten decimal digit storage positions plus an eleventh position for sign information, making a total of eleven storage positions in all. The output of the D-register 310 normally feeds to an adder circuit 312, where the various numeric operations of the computer are performed, and from the adder 312 to the output or A-register 314, which is substantially identical to the D-register 310. The D-register 310 is arranged to receive information from a main memory drum 316 or from the buffer control unit 20 on input. The A-register 314, in turn, is arranged to feed information onto the storage drum 316 or to the buffer control unit 20 on output.

The D-register 310, the adder 312, and the A-register 314 are under the control of an arithmetic control unit 320 which, in turn, is under the control of a central control unit 322. In general, in the internally programmed computer, a digital command is read into the D-register 310 from storage in response to the central control 322. Four of the digits, for example, in the command number, contain information for designating selected ones of the input buffer units or output buffer units to be utilized in combination with the computer during that command. This unit designation information is fed in parallel into a storage decade 324. Once the unit designation information is read onto the decade 324, a matrix circuit 326 energizes the corresponding unit designation line, UDLR or UDLW, according to the selected input buffer unit or output buffer unit.

The command information under the control of the computer then is shifted through the adder 312 onto a command or C-register 328, which is similar to the registers 310 and 314. If a certain command pattern exists on certain toggles in the C-register 328, an *and* circuit in the buffer control unit 20, indicated at 330, is gated open allowing an output pulse from the Arithmetic Control 320 to trigger on a buffer read (BR) toggle 332. This indicates that the computer is ready to receive information from the selected buffer input unit. The sequence of events for selecting or designating a buffer input unit and the subsequent reading in of information from a buffer input unit to a computer is shown in the timing diagram of FIG. 12.

Figure 12:
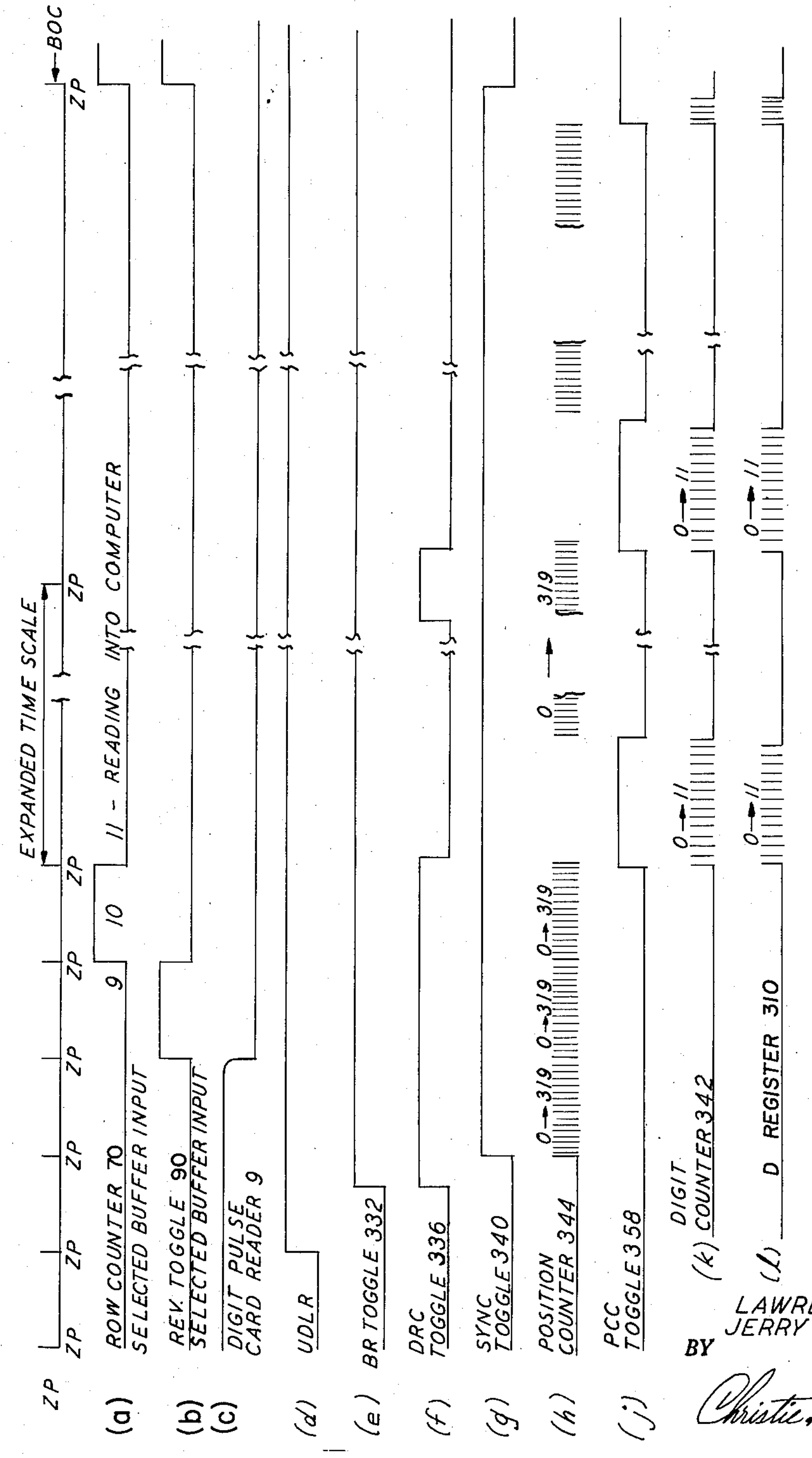
FIG. 12 is a timing diagram showing the sequence of operation of the various circuits in the diagram of FIG. 11.

As stated above, initially a command is read into the D-register. As a result, a particular command number is fed into the decade 324 when an *and* circuit 334 is triggered on by a control pulse from the central control circuit 322 in the computer 10. The pulse from the central control unit 322 may occur at any time before or after the reading the last row of a card into the buffer drum. In FIG. 12, it is shown as occurring during the time the last row of the card is in the reading station of the card reader. The decade 324, by means of the matrix circuit 326, raises the level of a selected one of several input unit designation lines, UDLR. See FIG. 12(*d*). This actuates the timing generator in the selected buffer input unit, as described above in connection with FIG. 4. Once the desired buffer input unit is selected in response to the command number stored on the decade 324, the buffer control unit 20 begins to receive zero pulses and buffer pulses from the drum of the selected buffer input unit.

Under the operation of the computer, the command information on the D-register 310 is then shifted through the adder 312 into the C-register 328. As a result, assuming the proper command is stored in the register 328, the *and* circuit 330 is gated open permitting the BR toggle 332 to be gated on. See FIG. 12*e*. At the same time, the control pulse from the central control unit 322 of the computer 10 triggers on the D-register control toggle 336, designated DRC toggle, indicating that the D-register 310 is now empty and ready to receive information from the selected buffer input unit. See FIG. 12*f*.

The BR toggle 332 controls an *and* circuit 338 on one input side of a sync toggle 340, the *and* circuit 338 also being responsive to the condition of the sync toggle 340. A zero pulse is passed by the *and* circuit 338 once the BR toggle 332 is triggered on, permitting the next zero pulse $ZP_s$ from the selected buffer input unit to trigger on the sync toggle 340. See FIG. 12*g*. The sync toggle 340 thereby synchronizes further operation of the buffer control unit 20 with the selected buffer input unit.

In order to read the information into the computer from the selected buffer drum in word lengths of eleven digits, a digit counter 342 and a position counter 344 are provided in the buffer control unit 20. The digit counter 342 counts from 0 through 11 to count the shifting of digits into the D-register 310 from the buffer control unit 20. The position counter 344 counts from 0 to 319, and thus counts, in response to buffer pulses from the drum, one complete revolution of the buffer drum 30.

The position counter 344 is initially set to its 0 count condition by a zero pulse $ZP_s$ from the selected buffer unit through an *and* circuit 346, which is normally open when the sync toggle 340 is in its "off" condition. The output of the *and* circuit 346 is coupled through an *or* circuit 348 to the position counter 344 for setting the position counter at zero.

The position counter 344 is made to count by zero pulses and buffer pulses from the selected buffer input unit coupled to the position counter through an *or* circuit 350 and *and* circuit 352. The *and* circuit 352 is gated open only when three conditions exist. First, the position counter 344 must not be in its last count condition, i.e., 319. This is ascertained by means of a matrix circuit 354 connected to the position counter 344, the matrix circuit being designed to energize an output line to a high potential level when the position counter is in its 319 count condition. The 319 count output line from the matrix circuit 354 is connected through an inverter 356 to the *and* circuit 352.

Another condition required for the *and* circuit 352 to be gated open is that the sync toggle 340 be in its "on" condition. The third condition required for the *and* circuit 352 to be gated open is that a position counter control toggle (PCC) 358 be in its "off" condition. Accordingly, the *and* circuit 352 is connected to the "on" side of the sync toggle 340 and the "off" side of the PCC toggle 358.

As shown in FIG. 12*h*, with the proper conditions on the *and* circuit 352 to gate it open, the position counter 344 is counted by the zero pulses and buffer pulses from the drum to its count condition 319, at which time the

*and* circuit 352 is gated closed and an *and* circuit 360 is gated open, the *and* circuit 360 being connected to the 319 output of the matrix circuit 354. As a result, the next pulse from the *or* circuit 350 is passed by the *and* circuit 360 to the *or* circuit 348, whereby the position counter 344 is returned to its zero count position. If the toggles 340 and 358 remain unchanged, the cycle is repeated and continues to repeat.

However, when the row counter 70 in the selected buffer input unit reaches its count-10 condition following the reading of the row 9 off the punched card, as represented in FIG. 12(*a*), an *and* circuit 362 passes the next zero setting pulse from the *or* circuit 348 to the position counter control toggle (PCC) 358 to trigger it to its "on" condition. See FIG. 12*j*. The *and* circuit 362 is also responsive to the output of the buffer read (BR) toggle 332 and the output of the sync toggle 340, which in the sequence of events above described have already been triggered to their "on" condition.

With the PCC toggle 358 and the BR toggle 332 triggered on, an *and* circuit 364 connected to the outputs of these two toggles passes a high level potential to an *and* circuit 366 to which are connected buffer pulses $BP_s$–7 from the selected input buffer drum. The *and* circuit 366 is also controlled by the selected format by means of an *or* circuit 368 connected through a pair of inverter circuits 370 and 372 to the two channels $F_2$ and $F_2'$ of the format delay 60 in the selected buffer input unit. Thus, the output of the *or* circuit 368 is raised to a high level potential for all conditions of format except the "Delete Digit" format, which is indicated by a binary number 11. As a result, except for the "Delete Digit" format, buffer pulses, called SDP, are passed by the *and* circuit 366 to the shifting input of the D-register 310 for shifting digits as they are read off the buffer drum through the translator circuit in buffer control into the D-register 310. See FIG. 12L.

It should be noted that the first SDP pulse passed by the *and* circuit 366 resets the DRC toggle 336 to its "off" condition. An *and* circuit 373 is gated open when the digit counter 342 is in the 0-count condition by means of a 0-line output from the matrix 378 connected to the *and* circuit 373.

At the same time, the digit counter 342 counts the number of digits read into the D-register 310 by means of buffer pulses $BP_s$–4 passed to the digit counter 342 through an *and* circuit 374. See FIG. 12*k*. The *and* circuit 374 is gated on in response to three conditions, the first being that the BR toggle 332 and the PCC toggle 358 be triggered on. Hence the *and* circuit 374 is connected to the output of the *and* circuit 364. Second, the digit counter 342 must not be in its count 11 condition. Thus, the *and* circuit 374 is connected through an inverter 376 to the line 11 output of a matrix circuit 378 connected to the respective toggles of the digit counter 342. Third, the format must not be "Delete Digit," in which event, as pointed out above, the D-register 310 is not shifted when the digit to be deleted is received from the buffer control.

After eleven digits including sign are transferred into the D-register 310, thereby filling the register and completing one word for use in the computer, the digit counter 342 is in its count-11 condition. The *and* circuit 374 is thereby gated off to stop further counting of the digit counter 342. At the same time the line-11 output of the matrix circuit 378 gates on an *and* circuit 380 which passes the next buffer pulse $BP_s$ from the selected buffer input unit to the *or* circuit 348 thereby setting the position counter 344 back to zero. The output of the *or* circuit 348 is connected also to an *and* circuit 382 which is gated open by the PCC toggle 358 when the latter is triggered to its "on" condition. As a result, the digit counter 342 is set by the output from the *and* circuit 382 back to its count-0 condition.

In addition to setting the digit counter 342 back to zero, the output pulse from the *or* circuit 348 is also coupled to *and* circuit 384 which is gated open by the PCC toggle 358. The output of the *and* circuit 384 is coupled to the off side of the PCC toggle 358, whereby the PCC toggle 358 is triggered to its "off" condition at the same time the digit counter 342 is set back to zero.

With the PCC toggle 358 in its "off" condition and with the position counter 344 in its zero count condition, zero pulses and buffer pulses passed by the *or* circuit 350 count the position counter 344 again. As the position counter 344 continues to count, the DRC toggle 336 is triggered to its "on" condition in response to a pulse from the arithmetic control unit 320 in the computer, which pulse is generated when the word in the D-register passes through the adder to the A-register 314. This pulse from the arithmetic control unit is passed by an *and* circuit 386 which is gated open in response to the BR toggle 332. The pulse passed by the *and* circuit 386 to trigger the DRC toggle 336 to its "on" condition is coupled to the DRC toggle 336 through the *or* circuit 388.

The PCC toggle 358 is triggered to its "on" condition again by the next buffer pulse $BP_s$–7 from the selected buffer input unit passed by an *and* circuit 390 which, in turn, is gated on in response to four conditions. First, the row counter in the buffer input unit must be at its count-11 condition, which it is since it is triggered to the count-11 condition by the next zero pulse following setting of the row counter to its count-10 condition. Second, the buffer read toggle 332 must be in its "on" condition. Third, the DRC toggle 336 must be in its "on" condition, indicating that the D-register is ready to receive the next word. Fourth, the position counter 344 must be in its count-319 condition, indicating that at least one complete revolution of the drum has occurred since the last digit of the previous word was read into the D-register 310.

The sequence of events above described continues until the last digits are read out of the buffer input unit to the computer 10. Only after the last word is read into the computer does a zero pulse $ZP_s$ from the selected buffer input unit occur during the time the PCC toggle 358 is triggered on. Thus, an *and* circuit 392 controlled by the PCC toggle 358 gates a zero pulse from the selected buffer input unit to the buffer read toggle 332, triggering off the buffer read toggle and stopping all further action in the buffer control unit until the next command is set up in the computer 10. This ZP, designated BOC, is connected to the selected buffer input unit to control operation as above described in connection with FIG. 5.

The various pulses required to operate the translator portion of the buffer control unit are generated by means also shown in FIG. 11. Thus, the LCP pulses and the MIP pulses are produced from buffer pulses in the selected buffer input unit and gated through a pair of *and* circuits 394 and 396 respectively. The *and* circuits are gated open by a toggle 398. The toggle 398 alternately gates open the *and* circuits 394 and 396 in response to buffer pulses gated to trigger the toggle 398 to one condition or the other by means of a pair of *and* circuits 400 and 402.

The *and* circuits 400 and 402 are controlled by the toggle 398 such that when the toggle 398 is triggered to one stable condition it opens the *and* circuit associated with the opposite side of the toggle, whereby the next buffer pulse triggers the toggle 398 to its opposite stable condition. By this means successive buffer pulses alternately trigger the toggle 398 to one stable condition or the other.

The *and* circuits 400 and 402 are also controlled by format information. To this end each of the *and* circuits is connected to an *or* circuit 404 which, in turn, is connected to the two output channels $F_3$ and $F_3'$ of the format delaying circuit 60. By this means one or the other of the *and* circuits 400 and 402 is gated open except for the format "Insert Zero." The reason for this is that, as pointed out above, the "Insert Zero" format has no zone-numeric significance, so that if the zero is inserted after a zone digit, the next digit following the inserted zero wants to be a numeric digit.

So that the initial pulse starting the next word into the D-register 310 from the drum of the buffer input unit is an LCP pulse, an *and* circuit 406 is provided which gates a zero pulse to the toggle 398 to trigger it initially to its "on" condition. The *and* circuit 406 is gated on in response to the PCC toggle 358 and thus a zero pulse, received while the PCC toggle 358 is in its "off" condition, sets the toggle 398 to its "on" condition, whereby the toggle 398 is always kept in proper phase as far as zone and numeric digits on the buffer drum is concerned.

The SDMP pulses which gate open the *and* circuits 302, 304, 306 and 308 in the output of the translator (see FIG. 8) are produced from buffer pulses $BP_s$ from the selected buffer input unit drum and gated by an *and* circuit 408 which, in turn, is gated open in response to three conditions. First, the BR toggle 332 and the PCC toggle 358 must be in their "on" condition; hence the *and* circuit 408 is connected to the output of the *and* circuit 364. Second, the digit counter 342 must not be in its 0 count condition; hence the *and* circuit 408 is connected through an inverter 410 to the line-0 output of the matrix circuit 378. Third, the *and* circuit 408 wants to be gated open only in response to the format "Transfer Alphabetic" which is the format requiring straight transfer. To this end the *and* circuit 408 is connected to the output of an *and* circuit 412 coupled to the two output channels $F_3$ and $F_3'$ of the format delay circuit 60. The channel $F_3'$ corresponding to the most significant digit of the binary format number, is connected through an inverter 414. Thus for the binary number 01, which corresponds to the "Transfer Alphabetic" command, the inverter 414 raises the low level of the 0 binary digit to a high level potential, corresponding to a 1 binary digit. Accordingly, the *and* circuit 412 passes a high level potential to the *and* circuit 408.

The computer 10 is set up to use word lengths of eleven digits, the eleventh digit being reserved for sign information. Thus, in translating the information from a punch card into the computer, it is necessary that steps are taken to assure that the digit inserted in the eleventh position of each word is indicative of only sign information. If sign information is represented as a numeric digit in a column set aside for this sign on the punched card, the sign information is interpreted as numeric throughout the system. It is only necessary to space out the sign information by "Insert Zero" commands to bring the sign digit into the eleventh position of the computer word.

However, it is frequently desired to represent sign by an over-punch over the most significant digit of a numeric field on the punched card. Thus, positive numbers are indicated by an over-punch in the 12 row or by no over-punch, either case being interpreted the same. Negative numbers are indicated by an over-punch in the 11 row. In this case, the most significant digit at numeric time is followed by the sign information at zone time. In order that the sign information may get into the eleventh position of the word, the intervening space, if any, between the most significant digits and the eleventh position of the word must be filled with zeros by "Insert Zero" format. The zone over-punch indicating sign is then transferred to the eleventh position of the computer word.

However, as pointed out in the description of the translator above, a 12 or an 11 over-punch on an IBM card translates as a 4 or a 5 respectively into the zone decade 180. Since it is desired that 12 or 11 transfer into the computer as a zero or one respectively where they represent sign information, the *and* circuit 300 (see FIG. 8) inhibits the shifting of the four bit stored on the toggle 246 during sign time. To this end, the line-10 output in the matrix 378 on the output of the digit counter 342 is connected to the *and* circuit 300 through an inverter 416. Thus, when the digit counter is in the tenth digit condition, the *and* circuit 300 is gated closed. The MIP pulse, in triggering off the toggle 298, only gates open the *and* circuits 290 and 292, so that a 4 or 5 stored in binary form on the decade 180 translates as a 0 or 1 respectively into the D-register of the computer 310 at sign time, namely, at the eleventh position of the computer word.

It should be noted that since the information is read into the D-register with the least significant digit of a numeric field occurring first, the over-punch must be placed over the most significant digit in order that the sign information will occur last in point of time and be accordingly spaced out by the format. If the over-punch is placed over the least significant digit on the punch card, as sometimes occurs, provision must be made by suitable plug board wiring in the card reader itself to split the field to effectively move the over-punch into the column of the most significant digit. Also in such case a blank cannot be used as sign information but an over-punch must be used to indicate a sign.

It will be evident from the above description that format control provides a group of instructions which permit the card converter to scan the punch card fields to be read into the computer from the punch card reader, eliminating undesirable or unneeded information and arranging the desired information in the card columns into as many as 160 computer digit positions. By spreading one card column into two computer digits, alphabetic information may be inserted in the computer. By inserting zeros, the 160 information digits can be spread into as many as 29 computer words. However, card columns need not be interpreted alphabetically, so it is possible to compress strictly numeric information into the standard computer numeric code by deleting zone digits.

As pointed out in the description of the card converter thus far, one card is always recorded on the buffer drum in all 160 positions corresponding to 80 numeric punch positions on the card and 80 zone punch positions on the card. Should a card have some purely numeric fields which have no zone punches to be read, the blanks in zone positions are translated as an 8 in the zone positions of the computer word. See the table in FIG. 2. If it is desired to insert a numeric field into the computer in a compressed or strictly numeric representation, a "Delete Digit" format instruction is provided on the format band in every position corresponding to a zone position for the numeric field being converted. Two "Delete Digit" instructions in sequence result in an entire card column being removed on input into the computer, and are used where desired to disregard unwanted columns of information on the card.

The "Transfer Alphabetic" format instruction is the only one which permits card information to enter the computer. Thus, this format instruction is recorded on the buffer drum where card information is to be transferred into the computer.

The "Insert Zero" format instruction is used to fill out computer words with zeros so that it is not necessary to have eleven card digits to form a computer word. In alphanumeric fields the "Insert Zero" format instruction is located on the format band in such position as to fill the sign positions of alphanumeric computer words with zeros. Normally, an "Insert Zero" format instruction may not be used between the numeric and zone portions of a card column as it is read into the input buffer drum. In other words, the zone and numeric digits of an alphanumeric character must be stored in adjacent digit positions of the computer word. Where "Insert Zero" format instructions are used to space between card columns within an alphanumeric field, they must therefore always be used in multiples of two, except at the sign position of the computer words.

In purely numeric fields, as pointed out above, the "Insert Zero" format instruction is used to fill out the computer words with zeros and bring the sign information into the sign position of the computer word. For example, consider a numeric field on a punch card involving three columns. There will be a single numeric punch in each of the three columns and in addition there may be an over-punch in the column of the most significant digit to indicate the sign, either positive or negative. This makes a total of four bits of information available from the card, the sign and the three digits. Since there are eleven positions in a computer word, seven zeros must be furnished by format control to fill out the computer word. These zeros are provided by the "Insert Zero" format instruction. Assuming that the least significant card column is entered into the least significant digit position of the computer word, the first format instruction is "Transfer Alphabetic." This must be followed by a "Delete Digit" format instruction to do away with the zone information associated with the first digit column, which in the case of a blank on the punch card would otherwise produce an 8 in the second position of the computer word.

A "Transfer Alphabetic" instruction then follows on the format, inserting the second digit into the computer word in the second position. This is again followed by a "Delete Digit" format instruction to remove the zone information associated with the second digit. The "Transfer Alphabetic" format instruction inserting the third or most significant digit in the computer word cannot be followed by "Delete Digit" format instruction, since the zone associated with the third digit contains the sign information for the word. This zone then must be inserted in the sign position of the computer word. Therefore, the "Transfer Alphabetic" format instruction for the third digit is followed by seven "Insert Zero" format instructions to move the zone information into the sign position of the computer word where another "Transfer Alphabetic" format instruction results in the transfer of the sign information of the computer word.

The "Replace by Zero" format instruction is a composite of the "Delete Digit" and the "Insert Zero" format instructions and results in a saving of format instructions in many cases and thus in more flexibility and capacity for the entire system. For example, in the above described situation in which a three-column numeric field is being transferred into the computer, if no sign information were involved, the zone position following the last or most significant digit could be replaced by a zero rather than simply deleted. Thus, only six "Insert Zero" format instructions are needed to fill out the computer word instead of seven.

What is claimed is:

1. Apparatus for translating coded information from a standard punch card in which the punches are arranged in horizontal rows and vertical columns to a digital computer having an input shifting register for receiving input computer words, said apparatus comprising a buffer magnetic storage drum having clock pulses recorded thereon for dividing the drum periphery into a predetermined number of information storage positions, the number of clock pulses and corresponding information positions being substantially greater than the number of punch card columns, the buffer drum further having recorded thereon at least one format control band in which predetermined commands are recorded in pulse form for each of the information positions, means for sensing the information on the punch card a row at a time, means including a storage register coupled to the sensing means for sequentially transferring digits indicative of the row being sensed to the information positions on the buffer drum in response to each punch sensed on the card, means for shifting the storage register to provide the sequential transfer of digits to the drum, means for coupling clock pulses from the buffer drum to the means for shifting the storage register, said coupling means including gating means responsive to the format command pulses recorded in the format band on the buffer drum, whereby the storage register is shifted at times corresponding to selected ones of the information positions around the drum as determined by the associated format command, means for transferring in sequence the digit pulse information in the information positions of the buffer drum to the shifting register on the computer input including gating means responsive to the format command pulses recorded in the format band on the buffer drum, whereby only selected digits are transferred at times corresponding to selected ones of the information positions around the drum as determined by the associated format command, and means for coupling clock pulses from the buffer drum to the shifting register on the computer input, said coupling means including gating means responsive to the format command pulses recorded in the format band on the buffer drum, whereby the shifting register is shifted at times corresponding to selected ones of the information positions around the drum as determined by the associated format command.

2. Apparatus for translating coded information from a standard punch card in which the punches are arranged in horizontal rows and vertical columns to a digital computer having a shifting register for receiving input computer words, said apparatus comprising a buffer magnetic storage drum having clock pulses recorded thereon for dividing the drum periphery into a predetermined number of information storage positions, the number of clock pulses and corresponding information positions being substantially greater than the number of punch card columns, the buffer drum further having recorded thereon at least one format control band in which predetermined commands are recorded in pulse form for each of the information positions, means for sensing the information on the punch card a row at a time, means including a storage register coupled to the sensing means for sequentially transferring digits indicative of the row being sensed to the information positions on the buffer drum in response to each punch sensed on the card, means for shifting the storage register to provide the sequential transfer of digits to the drum, means for coupling clock pulses from the buffer drum to the means for shifting the storage register, means for transferring in sequence the digit pulse information in the information positions of the buffer drum to the shifting register on the computer input including gating means responsive to the format command pulses recorded in the selected format band on the buffer drum, whereby only selected digits are transferred at times corresponding to selected ones of the information positions around the drum as determined by the associated command, and means for coupling clock pulses from the buffer drum to the shifting register on the computer input, said coupling means including gating means responsive to the format command pulses recorded in the selected format band on the buffer drum, whereby the shifting register is shifted at times corresponding to selected ones of the information positions around the drum as determined by the associated format command.

3. Apparatus for translating coded information from a standard punch card in which the punches are arranged in horizontal rows and vertical columns to a digital computer having a shifting register for receiving input computer words, said apparatus comprising a buffer magnetic storage drum having clock pulses recorded thereon for dividing the drum periphery into a predetermined number of information storage positions, the number of clock pulses and corresponding information positions being substantially greater than the number of punch card columns, means for sensing the information on the punch card a row at a time, means including a storage register coupled to the sensing means for sequentially transferring digits indicative of the row being sensed to the information positions on the buffer drum in response to each punch sensed on the card, means for shifting the storage register to provide the sequential transfer of digits to the drum, means for coupling clock pulses from the buffer drum to the means for shifting the storage register, means for transferring in sequence the digit pulse information in the information positions of the buffer drum to the shifting register on the computer input, and means for coupling clock pulses from the buffer drum to the shifting register on the computer input.

4. Apparatus for translating alphanumeric information from a standard punch card having punches arranged in vertical columns and in two groups of horizontal rows, designated zone rows and numeric rows, to a binary-coded decimal computer having an input storage register, said apparatus comprising means for simultaneously storing in electrical form a plurality of binary-coded digits, said means including a number of digit storage positions substantially in excess of twice the number of punch card vertical columns, means for successively sensing and identifying by binary-coded digits in electrical form each of the rows on the punch card, means for sensing a row at a time all of the punches in each successive row, means responsive to the punch sensing means and the row identifying means for establishing in binary-coded form row identifying digits in selected storage positions in the storing means according to the row being sensed and the punches sensed in that row respectively, said last-named means including means for channeling zone row digits and numeric row digits to alternate storage positions in the storing means, whereby each column in the punch card has associated therewith two digit storage positions in the storing means, one position for zone row digits and one position for numeric row digits, said last-named means further including a format control means linking each card column as sensed by the column sensing means with a preselected pair of storage positions in the storing means, whereby the punch card information is transferred to selected ones of the storing positions equal to twice the number of card columns out of the total number of storing positions available, means for transferring the digits stored in the storing means sequentially to the computer input register including means for simultaneously shifting digits out of the storing means and shifting the digits into the register, and format control means including means for selectively interrupting the shifting of the input register of the computer at the time a digit is shifted out of the storing means, whereby a digit is deleted from the computer input, and further including means for selectively gating off the output of the storing means while the storing means and input register are being shifted, whereby a digit from the storing means is replaced by a zero in the computer input.

5. Apparatus for translating alphanumeric information from a standard punch card having punches arranged in vertical columns and in two groups of horizontal rows, designated zone rows and numeric rows, to a binary-coded decimal computer having an input storage register, said apparatus comprising means for simultaneously storing in electrical form a plurality of binary-coded digits, said means including a number of digit storage positions at least twice the number of punch card vertical columns, means for successively sensing and identifying by binary-coded digits in electrical form each of the rows on the punch card, means for simultaneously sensing a row at a time all of the punches in each successive row, means responsive to the punch sensing means and the row identifying means for establishing in binary-coded form row identifying digits in selected storage positions in the storing means according to the row being sensed and the punches sensed in that row respectively, said last-named means including means for channeling zone row digits and numeric row digits to alternate storage positions in the storing means, whereby each column in the punch card has associated therewith two digit storage positions in the storing means, one position for zone row digits and one position for numeric row digits, and means for transferring the digits stored in the storing means sequentially to the computer input register including means for simultaneously shifting digits out of the storing means and shifting the digits into the register.

6. Apparatus for translating alphanumeric information from a standard punch card having punches arranged in vertical columns and in two groups of horizontal rows designated zone rows and numeric rows, said apparatus comprising means for simultaneously storing in electrical form a plurality of binary-coded digits, said means including a number of digit storage positions, means for successively sensing and identifying by binary-coded digits in electrical form each of the rows on the punch card, means for simultaneously sensing a row at a time all of the punches in each successive row, and means responsive to the punch sensing means and the row identifying means for establishing in binary-coded form row identifying digits in selected storage positions in the storing means according to the row being sensed and the punches sensed in that row respectively.

7. Apparatus for converting data from a punch card to a digital computer, said apparatus comprising a shifting register, means for successively shifting in parallel onto the shifting register the punch pattern of each successive row on the card, a magnetic storage drum means including a plurality of recording tracks, gating means for coupling pulses shifted from the shifting register to selected ones of four tracks on the drum, means including a binary row counter stepped in response to the reading of successive rows into the shifting register, the row counter controlling the gating means to establish a binary pulse pattern on the four tracks indicative of the particular row stored on the shifting register, whereby the pulses shifted out of the shifting register write the number of the row on the drum in successive positions around the drum as determined by the serial time spacing of the shifting register output pulses, means for generating shifting pulses in response to clock pulses positioned around the drum, gating means for coupling the shifting pulses to the register, and means for controlling the gating means including means responsive to format pulses positioned around the drum for actuating said gating means according to a predetermined schedule, whereby the column information on the card may be spaced out around the drum according to a preset pattern.

8. Apparatus as defined in claim 7 wherein said means for generating shifting pulses includes means responsive to the row counter for selecting a first group of alternate clock pulses during transfer of a first preselected group of rows and selecting the intermediate alternate clock pulses during transfer of a second preselected group of rows, whereby punches occurring in columns of both the first and second group of rows are interlaced on the drum surface.

9. Apparatus for coding alphanumeric punch card information, stored in the form of punches located in vertical columns and horizontal rows, in digit form usable directly in a digital computer, the apparatus comprising means for sensing the punches in the punch card one row at a time, means for counting the rows as they are sensed to establish a different digit in pulse form for each row, means responsive to the sensing means and row counting means for storing separately for each column in which punches are sensed in a first group of rows the respective sums of the row digits of the first group of rows in which the punches in each column occur, means responsive to the sensing means and row counting means for storing separately for each column in which punches are sensed in a second group of rows the respective sums of the row digits of the second group of rows in which the punches in each column occur, and means for transferring the digit sums stored in response to punches in the first group of rows and the digit sums stored in response to punches in the second group of rows alternately and in sequence to the computer, said transferring means including translating means for converting digit sums stored in the drum to digit values acceptable to the computer according to a predetermined code.

10. Apparatus for coding alphanumeric punch card information, stored in the form of punches located in vertical columns and horizontal rows in digit form usable directly in a digital computer, the apparatus comprising means for sensing the punches in the punch card one row at a time, means for counting the rows as they are sensed to establish a different digit in pulse form for each row, means responsive to the sensing means and row counting means for storing separately for each column in which punches are sensed in a first group of rows the respective sums of the row digits of the first group of rows in which the punches in each column occur, means responsive to the sensing means and row counting means for storing separately for each column in which punches are sensed in a second group of rows the respective sums of the row digits of the second group of rows in which the punches in each column occur, and means for transferring the digit sums stored in response to punches in the first group of rows and the digit sums stored in response to punches in the second group of rows alternately and in sequence to the computer.

11. Apparatus for coding alphanumeric punch card information stored in the form of punches located in vertical columns and horizontal rows in digit form usable directly in a digital computer, the apparatus comprising means for sensing the punches in the punch card one row at a time, means for counting the rows as they are sensed to establish a different digit in pulse form for each row, means responsive to the sensing means and row counting means for storing separately for each column in which punches are sensed in a first group of rows the respective sums of the row digits of the first group of rows in which the punches in each column occur, and means responsive to the sensing means and row counting means for storing separately for each column in which punches are sensed in a second group of rows the respective sums of the row digits of the second group of rows in which the punches in each column occur.

12. Apparatus for transferring information digits from a storage drum to a shifting register where the drum has a predetermined number of storage positions substantially greater than the number of storage positions in the register, the drum having clock pulses stored therein equal in number to the number of storage positions around the periphery of the drum, said apparatus comprising means for recording in digit pulse form one of at least three different format commands on the drum at positions corresponding to each information position on the drum, means including gating means responsive to the format command pulses on the drum for transferring information digits one at a time to the storage register input, the gating means being biased open to permit transfer of digits only in response to pulses establishing a first one of the format commands, means including gating means responsive to the format command pulses on the drum for transferring clock pulses to the shifting input of the shifting register, the gating means being biased open to permit transfer of clock pulses in response to pulses establishing said first of the format commands and to pulses establishing a second one of the three format commands, whereby the corresponding information digit is transferred and shifted into the register in response to a first format command, the information is not transferred but the register is shifted to replace the digit by a zero in response to a second format command, and the information digit is not transferred and the register is not shifted to delete the information digit in response to a remaining format command, a first pulse counter responsive to the pulses coupled to the shifting input of the register, a second pulse counter responsive to the clock pulses on the drum, means for gating on the first counter when the second counter has counted a number of pulses equal to the information positions on the drum, and alternately gating on the second counter when the first counter has counted a number of pulses equal to the storage positions in the register, said last-named means further including means for interrupting the shifting of the register during the time the second counter is counting, whereby successive groups of information digits are shifted to the storage register on successive revolutions of the drum.

13. Apparatus for transferring information digits from a storage drum to a shifting register where the drum has a predetermined number of storage positions substantially greater than the number of storage positions in the register, the drum having clock pulses stored therein equal in number to the number of storage positions around the periphery of the drum, said apparatus comprising means for recording in digit pulse form one of at least three different format commands on the drum at positions corresponding to each information position on the drum, means including gating means responsive to the format command pulses on the drum for transferring information digits one at a time to the storage register input, the gating means being biased open to permit transfer of digits only in response to pulses identifying a first one of the format commands, and means including gating means responsive to the format command pulses on the drum for transferring clock pulses to the shifting input of the shifting register, the gating means being biased open to permit transfer of clock pulses in response to pulses identifying said first of the format commands and to pulses identifying a second one of the three format commands, whereby the corresponding information digit is transferred and shifted into the register in response to a first format command, the information is not transferred but the register is shifted to replace the digit by a zero in response to a second format command, and the information digit is not transferred and the register is not shifted to delete the information digit in response to a remaining format command.

14. Apparatus for transferring information digits from a storage drum to a shifting register where the drum has a predetermined number of storage positions substantially greater than the number of storage positions in the register, the drum having clock pulses stored therein equal in number to the number of storage positions around the periphery of the drum, said apparatus comprising means for transferring information digits one at a time to the storage register input, means for transferring clock pulses to the shifting input of the shifting register, a first pulse counter responsive to the pulses coupled to the shifting input of the register, a second pulse counter responsive to the clock pulses on the drum, means for gating on the first counter when the second counter has counted a number of pulses equal to the information position on the drum and alternately gating on the second counter when the first counter has counted a number of pulses equal to the storage positions in the register, said last-named means further including means for interrupting the shifting of the register during the time the second counter is counting, whereby successive groups of information digits are shifted to the storage register on successive revolutions of the drum.

15. Apparatus for supplying information to a digital computer comprising a plurality of input machines for reading out in electrical form the information stored on punch cards, a plurality of intermediate storage means, one storage means being associated with a corresponding one of the input machines, means for simultaneously transferring to each of the storage means in pulse coded form the information stored on one card in each of the corresponding input machines, means responsive to command pulses from the computer for successively reading out information from the plurality of intermediate storage means to the computer input, whereby a continuous stream of information at high speed is fed to the computer from a plurality of card reading machines operating at low speed but continuously and substantially simultaneously.

References Cited in the file of this patent

UNITED STATES PATENTS

| | | |
|---|---|---|
| 2,609,143 | Stibitz | Sept. 2, 1952 |
| 2,702,380 | Brustman et al. | Feb. 15, 1955 |

OTHER REFERENCES

Description of a Magnetic Drum Calculator, Harvard University Press, 1952, 318 pp., pages 22–25, 158, and 159 are relied upon.